US010690911B2

(12) United States Patent
Yatsu et al.

(10) Patent No.: US 10,690,911 B2
(45) Date of Patent: Jun. 23, 2020

(54) PROJECTION OPTICAL SYSTEM AND HEAD-UP DISPLAY DEVICE

(71) Applicants: MAXELL, LTD., Kyoto (JP); HITACHI INDUSTRY & CONTROL SOLUTIONS, LTD., Hitachi-shi, Ibaraki (JP)

(72) Inventors: Masahiko Yatsu, Osaka (JP); Koji Hirata, Osaka (JP); Kazuomi Kaneko, Osaka (JP)

(73) Assignees: MAXELL, LTD., Kyoto (JP); HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 0 days.

(21) Appl. No.: 15/766,398

(22) PCT Filed: Oct. 9, 2015

(86) PCT No.: PCT/JP2015/078792
§ 371 (c)(1),
(2) Date: Apr. 6, 2018

(87) PCT Pub. No.: WO2017/061039
PCT Pub. Date: Apr. 13, 2017

(65) Prior Publication Data
US 2018/0314063 A1 Nov. 1, 2018

(51) Int. Cl.
*G02B 27/01* (2006.01)
*G02B 5/10* (2006.01)
(Continued)

(52) U.S. Cl.
CPC .......... *G02B 27/0101* (2013.01); *B60K 35/00* (2013.01); *G02B 5/10* (2013.01);
(Continued)

(58) Field of Classification Search
CPC ............ G02B 5/00–32; G02B 7/00–40; G02B 27/00–0189; G02B 2027/0105–0198
See application file for complete search history.

(56) References Cited

U.S. PATENT DOCUMENTS 9,030,749 B2 5/2015 Lescure et al.
2007/0229394 A1 10/2007 Ishikawa et al.
(Continued)

FOREIGN PATENT DOCUMENTS

JP 2007-272061 A 10/2007
JP 2009-44146 A 2/2009
(Continued)

OTHER PUBLICATIONS

International Search Report of PCT/JP2015/078792 dated Dec. 15, 2015.

*Primary Examiner* — Cara E Rakowski
*Assistant Examiner* — Christopher A Lamb, II
(74) *Attorney, Agent, or Firm* — Mattingly & Malur, PC

(57) ABSTRACT

A head-up display device includes: an image formation unit which emits light including image information; and a projection optical system including an ocular optical system which displays a virtual image by reflecting the light emitted from the image formation unit. The ocular optical system includes spherical lenses, a free-form curved surface lens, a reflection mirror, and a free-form curved surface mirror, and is configured by arranging, in a space on the side of the ocular optical system of a plane conjugate with the virtual image plane with respect to the ocular optical system, a first small lens system which achieves first focus position movement and on which separated light from the image formation unit is made to be incident, and a second small lens system
(Continued)

which achieves second focus position movement and on which separated light from the image formation unit is made to be incident.

12 Claims, 23 Drawing Sheets

(51) Int. Cl.
    *G02B 7/10*     (2006.01)
    *B60K 35/00*     (2006.01)
    *G02B 5/02*     (2006.01)

(52) U.S. Cl.
    CPC ........... *G02B 7/10* (2013.01); *G02B 27/0179* (2013.01); *B60K 2370/1529* (2019.05); *B60K 2370/23* (2019.05); *B60K 2370/334* (2019.05); *G02B 5/02* (2013.01); *G02B 2027/011* (2013.01); *G02B 2027/0183* (2013.01); *G02B 2027/0185* (2013.01)

(56) References Cited

U.S. PATENT DOCUMENTS

| | | | |
|---|---|---|---|
| 2009/0009846 A1* | 1/2009 | Destain | G02B 13/18 359/237 |
| 2009/0046265 A1 | 2/2009 | Komatsuda | |
| 2010/0053729 A1* | 3/2010 | Tilleman | G02B 6/14 359/298 |
| 2013/0021224 A1 | 1/2013 | Fujikawa et al. | |
| 2013/0265646 A1 | 10/2013 | Sakai | |
| 2014/0036374 A1* | 2/2014 | Lescure | G02B 27/0101 359/630 |
| 2014/0043591 A1* | 2/2014 | Kurashige | G02B 27/48 353/85 |
| 2016/0124231 A1 | 5/2016 | Watanabe et al. | |
| 2016/0178902 A1* | 6/2016 | Ando | B60K 35/00 348/115 |

FOREIGN PATENT DOCUMENTS

| | | |
|---|---|---|
| JP | 2009-122582 A | 6/2009 |
| JP | 2009-229552 A | 10/2009 |
| JP | 2011-128500 A | 6/2011 |
| JP | 2013-025205 A | 2/2013 |
| JP | 2013-127489 A | 6/2013 |
| JP | 2013-214008 A | 10/2013 |
| JP | 2015-011212 A | 1/2015 |
| JP | 2015-034919 A | 2/2015 |

* cited by examiner

FIG. 4
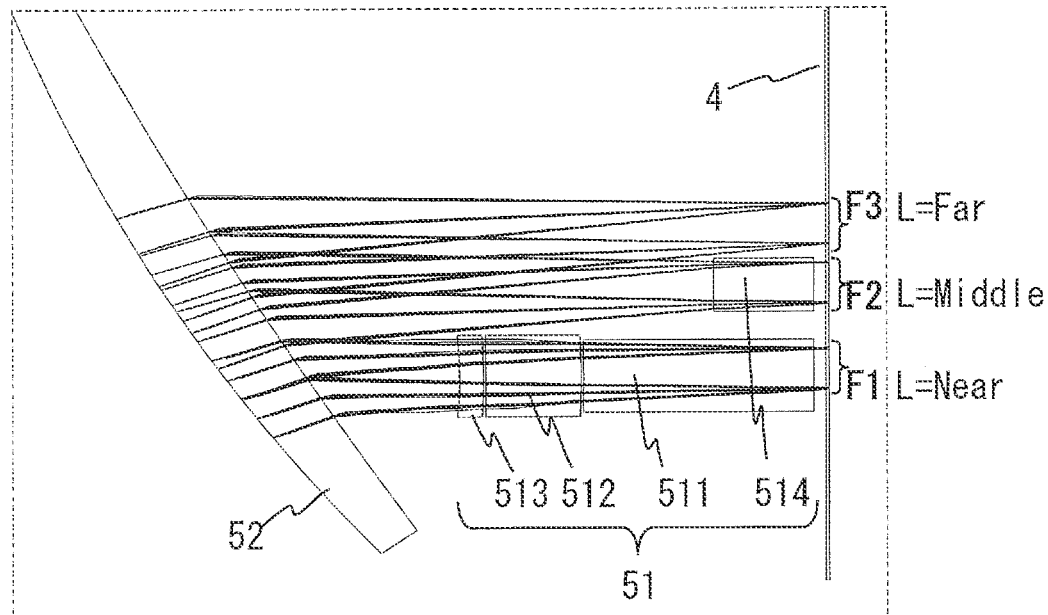
(a)
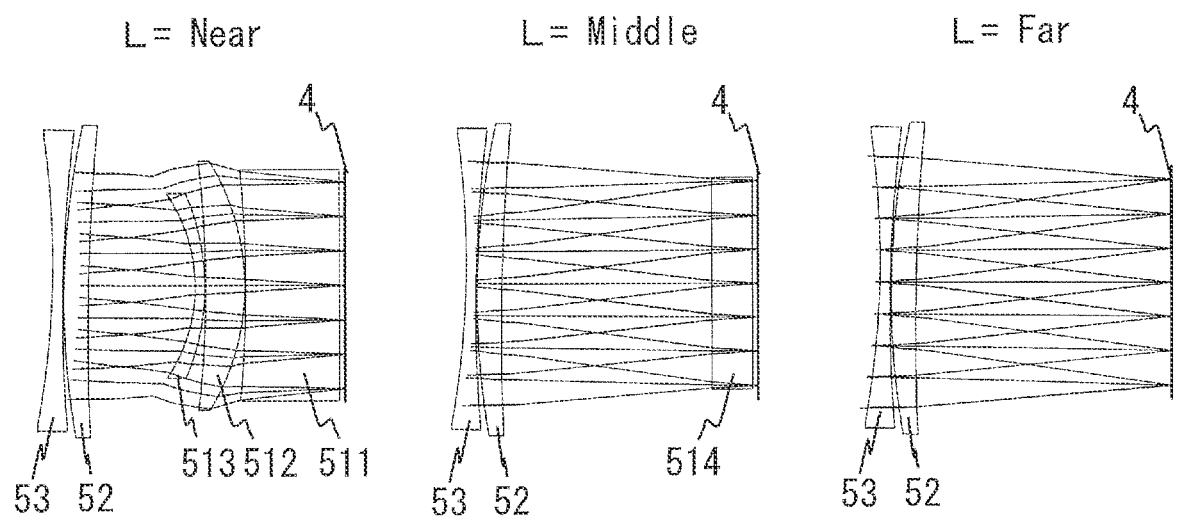
(b)

FIG. 5

VIP:VIRTUAL IMAGE PLANE
EP:ENTRANCE PUPIL
DS:DUMMY SURFACE
FIRST SL: FIRST SMALL LENS
SECOND SL: SECOND SMALL LENS
THIRD SL: THIRD SMALL LENS
SoDP:SUBSTRATE OF DIFFUSION PLATE
II:INTERMEDIATE IMAGE
S No.:SURFACE NUMBER
S0: SURFACE 0
PS:PLANE SURFACE
ANS:ANAMORPHIC NON-SPHERICAL SURFACE
FCS:FREE-FORM CURVED SURFACE
RoC:RADIUS OF CURVATURE
F-F D:FACE-TO-FACE DISTANCE
GMN:GLASS MATERIAL NAME
DoE/T:DETAIL OF ECCENTRICITY/TILTING
D&R:DECENTER & RETURN
NE:NORMAL ECCENTRICITY
A X-A:AROUND X-AXIS
A Y-A:AROUND Y-AXIS
A Z-A:AROUND Z-AXIS
VID:VIRTUAL IMAGE DISTANCE
YEo16S: Y-ECCENTRICITY OF SURFACE 16
YEo22S: Y-ECCENTRICITY OF SURFACE 22

| DESIG-NATION | S No. | SHAPE | RoC | F-F D | GMN | DoE/T | ECCENTRICITY(mm) X-AXIS | Y-AXIS | TILTING(DEGREE) A X-A | A Y-A | A Z-A |
|---|---|---|---|---|---|---|---|---|---|---|---|
| VIP | S0 | PS | ∞ | 10000※ | | | | | | | |
| EP | S1 | PS | ∞ | -680 | | | | | | | |
| WINDSHIELD | S2 | ANS | 9686 5531 | 0 | REFLECTING | D&R | -340 | -1959 | -131.321 | 4.725 | 0 |
| DS | S3 | | ∞ | 310.620 | | NE | 0 | 0 | -43.7 | 0 | 0 |
| MIRROR | S4 | FCS | | 0 | REFLECTING | D&R | 0 | 0 | -14.516 | -1.975 | 4.545 |
| DS | S5 | | | -136.053 | | NE | 0 | 0 | -38.354 | -2.280 | 0 |
| MIRROR | S6 | SPHERICAL | -426.527 | 0.000 | REFLECTING | D&R | 0 | 0 | 44.504 | 0.891 | 4.554 |
| DS | S7 | | ∞ | 34.115 | | NE | 0 | 0 | 93.562 | 16.653 | 0 |
| L1 | S8 | FCS | | 5.313 | 'PMMA25' | | 0 | 0 | 2.832 | -11.656 | -4.913 |
| | S9 | FCS | | 33.979 | | | 0 | 0 | 0 | 0 | 0 |
| L2 | S10 | SPHERICAL | -157.033 | 2.5 | EFL6_HOYA | NE | 13.859 | -35.009 | 6.295 | 2.365 | 7.331 |
| | S11 | SPHERICAL | 242.457 | 0.300 | | | | | | | |
| L3 | S12 | SPHERICAL | 137.059 | 6 | FDS90_HOYA | | | | | | |
| | S13 | SPHERICAL | 394.994 | 25.915 | | | | | | | |
| DS | S14 | SPHERICAL | ∞ | 0.000 | | NE | 0.000 | 0.000 | -32.679 | -1.348 | -0.441 |
| DS | S15 | SPHERICAL | ∞ | 0.000※ | | NE | -0.325 | -20.724 | 0.000 | 0.000 | 0.000 |
| FIRST SL | S16 | SPHERICAL | -32.880※ | 2.000※ | FDS90_HOYA | NE | 0 | -6.551※ | 0 | 0 | 0 |
| | S17 | SPHERICAL | -46.585※ | 0.200※ | | | | | | | |
| SECOND SL | S18 | SPHERICAL | -211.561※ | 8.000※ | FDS90_HOYA | | | | | | |
| | S19 | SPHERICAL | -47.953※ | 0.200※ | | | | | | | |
| THIRD SL | S20 | SPHERICAL | -245.475※ | 19.300※ | FDS90_HOYA | NE | 0 | 6.551※ | 0 | 0 | 0 |
| | S21 | SPHERICAL | ∞ | 1 | | | | | | | |
| SoDP | S22 | PS | ∞ | 0.3 | 58.3 | | | | | | |
| | S23 | PS | ∞ | | | | | | | | |
| II | S24 | PS | ∞ | | | | | | | | |

| | VID 10000 | | | VID 30000 | | | VID 100000 | | |
|---|---|---|---|---|---|---|---|---|---|
| | RoC | F-F D | GMN | RoC | F-F D | GMN | RoC | F-F D | GMN |
| S15 | ∞ | 0 | | ∞ | 21.371 | | ∞ | 29.7 | |
| S16 | -32.880 | 2 | FDS90 | ∞ | 0 | | ∞ | 0 | |
| S17 | -46.586 | 0.200 | | ∞ | 0 | | ∞ | 0 | |
| S18 | -211.561 | 8.000 | FDS90 | ∞ | 0 | | ∞ | 0 | |
| S19 | -47.953 | 0.2 | | ∞ | 8.329 | FDS90 | ∞ | 0 | |
| S20 | -245.475 | 19.3 | FDS90 | ∞ | 0 | | ∞ | 0 | |
| S21 | ∞ | 1 | | ∞ | 1 | | ∞ | 1 | |

| | 10000 | 30000 | 100000 |
|---|---|---|---|
| YEo16S | -6.551 | 0.958 | 5.975 |
| YEo22S | 6.551 | -0.958 | -5.975 |

FIG. 6

| CODE | | SURFACE (SURFACE 4) | SURFACE A OF L1 (SURFACE 8) | SURFACE B OF L1 (SURFACE 9) |
|---|---|---|---|---|
| R | $1/c$ | ∞ | ∞ | ∞ |
| K | K | | | |
| C2 | $X$ | −8.09983E−03 | −1.21043E−01 | −1.34252E−01 |
| C3 | $Y$ | −1.19734E−02 | −1.99739E−01 | −2.58752E−01 |
| C4 | $X^2$ | −1.19986E−03 | 5.38057E−03 | 6.94883E−03 |
| C5 | $XY$ | 1.74494E−05 | −1.11097E−04 | 1.72832E−03 |
| C6 | $Y^2$ | −1.06091E−03 | −4.34026E−03 | −9.11633E−04 |
| C7 | $X^3$ | −5.02862E−08 | −1.78590E−05 | −6.20731E−06 |
| C8 | $X^2Y$ | −5.69000E−07 | −5.25063E−05 | −7.75852E−05 |
| C9 | $XY^2$ | 4.89857E−09 | −4.05145E−05 | −2.74459E−05 |
| C10 | $Y^3$ | −8.77685E−08 | −5.37064E−05 | 2.21455E−04 |
| C11 | $X^4$ | −9.14961E−11 | 3.72384E−07 | −1.19837E−08 |
| C12 | $X^3Y$ | 4.47542E−10 | 5.37709E−06 | 5.15963E−06 |
| C13 | $X^2Y^2$ | −1.99254E−09 | 2.81242E−06 | 5.93981E−06 |
| C14 | $XY^3$ | 4.82034E−10 | 2.72429E−07 | 3.46555E−08 |
| C15 | $Y^4$ | −1.57795E−09 | 7.64233E−06 | 1.70787E−05 |
| C16 | $X^5$ | −2.37341E−12 | 1.39226E−07 | 1.86919E−07 |
| C17 | $X^4Y$ | −2.68651E−12 | −1.70148E−07 | −1.18189E−07 |
| C18 | $X^3Y^2$ | −4.48250E−12 | −5.65584E−08 | −1.85396E−07 |
| C19 | $X^2Y^3$ | −2.31573E−11 | −6.90257E−08 | 2.28346E−08 |
| C20 | $XY^4$ | 2.15962E−11 | 1.53894E−08 | 2.34779E−09 |
| C21 | $Y^5$ | −6.98012E−11 | 4.53133E−07 | 5.37048E−07 |
| C22 | $X^6$ | −1.25510E−14 | −2.90911E−09 | −5.91946E−09 |
| C23 | $X^5Y$ | −2.69490E−14 | 3.33691E−09 | 1.53153E−09 |
| C24 | $X^4Y^2$ | 2.97230E−15 | 1.79110E−09 | 7.08340E−09 |
| C25 | $X^3Y^3$ | 6.17789E−14 | 4.41252E−10 | 4.86147E−10 |
| C26 | $X^2Y^4$ | −2.54915E−13 | 4.57707E−10 | 1.57896E−09 |
| C27 | $XY^5$ | −1.44047E−13 | −1.16392E−10 | −2.00434E−10 |
| C28 | $Y^6$ | 1.16575E−12 | 6.65051E−09 | 4.85164E−09 |
| C29 | $X^7$ | 1.29509E−16 | −4.09557E−11 | 7.18945E−11 |
| C30 | $X^6Y$ | 3.70450E−16 | −3.13951E−11 | −7.76128E−11 |
| C31 | $X^5Y^2$ | 1.02109E−16 | −1.57158E−11 | −1.85065E−10 |
| C32 | $X^4Y^3$ | 3.19648E−16 | 1.17193E−10 | 4.77039E−11 |
| C33 | $X^3Y^4$ | −2.66744E−16 | 4.41243E−11 | 6.16379E−11 |
| C34 | $X^2Y^5$ | 7.51031E−15 | 2.01418E−10 | 1.80720E−10 |
| C35 | $XY^6$ | −7.36115E−15 | 1.41813E−11 | 9.21396E−12 |
| C36 | $Y^7$ | −1.39268E−15 | −5.63070E−11 | −8.29155E−11 |
| C37 | $X^8$ | | 1.66815E−12 | −5.65314E−13 |
| C38 | $X^7Y$ | | −8.54194E−14 | 2.90079E−12 |
| C39 | $X^6Y^2$ | | 8.75706E−13 | 3.40971E−12 |
| C40 | $X^5Y^3$ | | −5.21285E−13 | −2.43764E−13 |
| C41 | $X^4Y^4$ | | 1.97381E−12 | −1.35157E−12 |
| C42 | $X^3Y^5$ | | 1.07727E−13 | −7.89638E−13 |
| C43 | $X^2Y^6$ | | 5.28178E−12 | 4.45448E−12 |
| C44 | $XY^7$ | | 3.15829E−13 | 1.96243E−13 |
| C45 | $Y^8$ | | −1.78946E−12 | −1.64295E−12 |
| C46 | $X^9$ | | −8.95949E−15 | 1.22716E−14 |
| C47 | $X^8Y$ | | 1.18163E−14 | −1.46161E−14 |
| C48 | $X^7Y^2$ | | 5.32273E−15 | 1.16772E−14 |
| C49 | $X^6Y^3$ | | −3.35753E−15 | −3.41363E−15 |
| C50 | $X^5Y^4$ | | −2.71496E−14 | −3.53621E−14 |
| C51 | $X^4Y^5$ | | 5.61896E−15 | −4.94247E−14 |
| C52 | $X^3Y^6$ | | 4.33044E−15 | −2.68342E−14 |
| C53 | $X^2Y^7$ | | 3.57218E−14 | 2.76447E−14 |
| C54 | $XY^8$ | | −1.25845E−14 | −8.53045E−15 |
| C55 | $Y^9$ | | −1.99791E−15 | −2.57399E−15 |

FIG. 13
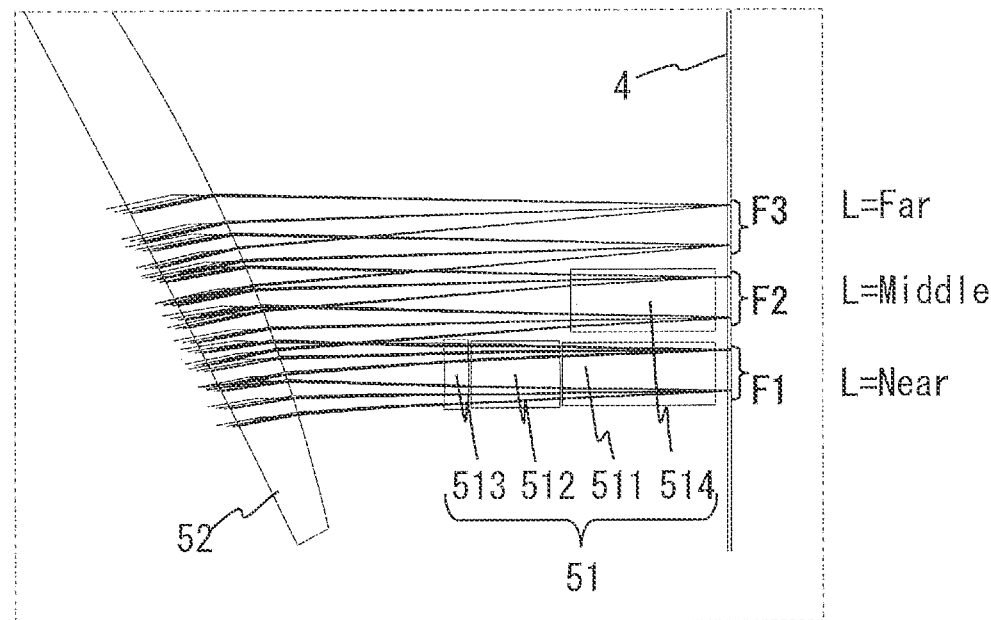
(a)
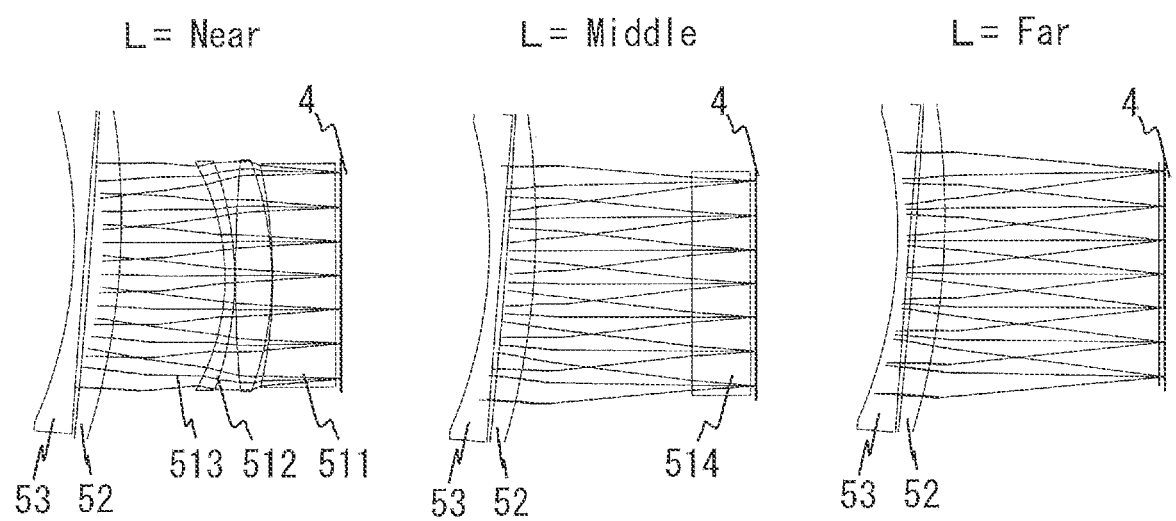
(b)

FIG. 14

VIP: VIRTUAL IMAGE PLANE
EP: ENTRANCE PUPIL
DS: DUMMY SURFACE
FIRST SL: FIRST SMALL LENS
SECOND SL: SECOND SMALL LENS
THIRD SL: THIRD SMALL LENS
SoDP: SUBSTRATE OF DIFFUSION PLATE
II: INTERMEDIATE IMAGE
S No.: SURFACE NUMBER
S0: SURFACE 0
PS: PLANE SURFACE
ANS: ANAMORPHIC NON-SPHERICAL SURFACE
FCS: FREE-FORM CURVED SURFACE
RoC: RADIUS OF CURVATURE
F-F D: FACE-TO-FACE DISTANCE
GMN: GLASS MATERIAL NAME
DoE/T: DETAIL OF ECCENTRICITY/TILTING
D&R: DECENTER & RETURN
NE: NORMAL ECCENTRICITY
A X-A: AROUND X-AXIS
A Y-A: AROUND Y-AXIS
A Z-A: AROUND Z-AXIS
VID: VIRTUAL IMAGE DISTANCE
YE016S: Y-ECCENTRICITY OF SURFACE 16
YE022S: Y-ECCENTRICITY OF SURFACE 22

| DESIG-NATION | S No. | SHAPE | RoC | F-F D | GMN | DoE/T | ECCENTRICITY(mm) X-AXIS | ECCENTRICITY(mm) Y-AXIS | TILTING(DEGREE) A X-A | TILTING(DEGREE) A Y-A | TILTING(DEGREE) A Z-A |
|---|---|---|---|---|---|---|---|---|---|---|---|
| VIP | S0 | PS | ∞ | 14000※ | | | | | | | |
| EP | S1 | PS | ∞ | -680 | | D&R | -340 | -1959 | -43.7 | 0 | 0 |
| WINDSHIELD | S2 | ANS | 9686 / 5531 | 0 | REFLECTING | NE | 0 | 0 | -131.892 | 4.244 | 0 |
| DS | S3 | | ∞ | 309.387 | | D&R | 0 | 0 | -14.548 | -2.115 | 4.190 |
| MIRROR | S4 | FCS | ∞ | 0 | REFLECTING | NE | 0 | 0 | -39.607 | -2.213 | 0 |
| DS | S5 | | ∞ | -136.471 | | D&R | 0 | 0 | 42.848 | 0.663 | 4.359 |
| MIRROR | S6 | SPHERICAL | -474.664 | 0.000 | REFLECTING | NE | 0 | 0 | 90.545 | 16.224 | 0 |
| DS | S7 | | ∞ | 43.641 | | NE | 0 | 0 | 1.239 | -11.376 | -5.986 |
| L1 | S8 | FCS | ∞ | 3.58734927 | 'PMMA25' | | | | | | |
| | S9 | FCS | ∞ | 35.412 | | | | | | | |
| L2 | S10 | SPHERICAL | -83.443 | 2.5 | EFL6_HOYA | NE | 10.977 | -33.687 | 1.853 | 5.504 | 6.061 |
| | S11 | SPHERICAL | 2698.203 | 1.330 | | | | | | | |
| L3 | S12 | SPHERICAL | -1232.207 | 7 | FDS90_HOYA | | | | | | |
| | S13 | SPHERICAL | -132.787 | 24.822 | | | | | | | |
| DS | S14 | SPHERICAL | ∞ | 0.000 | | NE | 0.000 | 0.000 | -27.896 | -4.566 | -0.297 |
| DS | S15 | SPHERICAL | ∞ | 0.000※ | | NE | 1.195 | -25.132 | 0.000 | 0.000 | 0.000 |
| FIRST SL | S16 | SPHERICAL | -46.976※ | 2.000※ | FDS90_HOYA | NE | 0 | -6.300※ | 0 | 0 | 0 |
| | S17 | SPHERICAL | -65.465※ | 0.200※ | | | | | | | |
| SECOND SL | S18 | SPHERICAL | 275.626※ | 7.500※ | FDS90_HOYA | | | | | | |
| | S19 | SPHERICAL | -65.855※ | 0.200※ | | | | | | | |
| THIRD SL | S20 | SPHERICAL | -101.167※ | 12.800※ | FDS90_HOYA | NE | 0 | 6.300※ | 0 | 0 | 0 |
| | S21 | SPHERICAL | ∞ | 1 | | | | | | | |
| SoDP | S22 | PS | ∞ | 0.3 | 58.3 | | | | | | |
| | S23 | PS | ∞ | 0 | | | | | | | |
| II | S24 | PS | ∞ | | | | | | | | |

| | VID 14000 | | | VID 30000 | | | VID 100000 | | |
|---|---|---|---|---|---|---|---|---|---|
| | RoC | F-F D | GMN | RoC | F-F D | GMN | RoC | F-F D | GMN |
| S15 | ∞ | 0 | | ∞ | 10.592 | | ∞ | 22.7 | |
| S16 | -46.976 | 2 | FDS90 | ∞ | 0 | | ∞ | 0 | |
| S17 | -65.465 | 0.200 | | ∞ | 0 | | ∞ | 0 | |
| S18 | 275.626 | 7.500 | FDS90 | ∞ | 0 | | ∞ | 0 | |
| S19 | -65.856 | 0.2 | | ∞ | 12.108 | BSC7 | ∞ | 0 | |
| S20 | -101.167 | 12.8 | FDS90 | ∞ | 1 | | ∞ | 1 | |
| S21 | ∞ | 1 | | | | | | | |

| | 14000 | 30000 | 100000 |
|---|---|---|---|
| YE016S | -6.300 | -0.194 | 5.986 |
| YE022S | 6.300 | 0.194 | -5.986 |

FIG. 15

| CODE | | SURFACE (SURFACE 4) | SURFACE A OF L1 (SURFACE 8) | SURFACE B OF L1 (SURFACE 9) |
|---|---|---|---|---|
| R | $1/c$ | ∞ | ∞ | ∞ |
| K | K | | | |
| C2 | $X$ | -1.05869E-02 | -7.00924E-02 | -6.89564E-02 |
| C3 | $Y$ | -1.07960E-02 | -1.45642E-01 | -2.09767E-01 |
| C4 | $X^2$ | -1.18896E-03 | 6.12100E-03 | 8.12310E-03 |
| C5 | $XY$ | 1.23500E-05 | 2.45663E-03 | 4.71266E-03 |
| C6 | $Y^2$ | -1.03840E-03 | -5.47182E-03 | -1.66138E-03 |
| C7 | $X^3$ | -2.94850E-08 | -3.58011E-06 | 5.04796E-06 |
| C8 | $X^2Y$ | -6.05836E-07 | -1.86257E-05 | -5.88056E-05 |
| C9 | $XY^2$ | 1.29634E-08 | -5.33382E-05 | -1.54877E-06 |
| C10 | $Y^3$ | -1.93235E-07 | -2.72596E-05 | 2.34186E-04 |
| C11 | $X^4$ | -1.58486E-10 | 5.94770E-07 | 3.99847E-07 |
| C12 | $X^3Y$ | 2.54528E-10 | 5.74561E-06 | 5.08851E-06 |
| C13 | $X^2Y^2$ | -1.47830E-09 | 2.65088E-06 | 4.66570E-06 |
| C14 | $XY^3$ | 4.83610E-10 | -7.04406E-07 | -6.35125E-07 |
| C15 | $Y^4$ | -1.12998E-09 | 7.27709E-06 | 1.68719E-05 |
| C16 | $X^5$ | 5.22965E-14 | 1.39056E-07 | 2.06650E-07 |
| C17 | $X^4Y$ | -1.18165E-12 | -1.88154E-07 | -1.07232E-07 |
| C18 | $X^3Y^2$ | -2.27725E-12 | -7.28939E-08 | -1.84745E-07 |
| C19 | $X^2Y^3$ | -2.68881E-11 | -6.94473E-08 | 3.56525E-08 |
| C20 | $XY^4$ | 1.20419E-11 | 3.02980E-08 | 6.01826E-09 |
| C21 | $Y^5$ | -5.04587E-11 | 4.54656E-07 | 5.38798E-07 |
| C22 | $X^6$ | -7.99788E-15 | -2.77875E-09 | -6.04423E-09 |
| C23 | $X^5Y$ | 3.71633E-15 | 2.73182E-09 | 1.98795E-09 |
| C24 | $X^4Y^2$ | -1.24055E-14 | 1.53241E-09 | 7.50057E-09 |
| C25 | $X^3Y^3$ | 5.33638E-17 | 3.38232E-10 | 6.25956E-10 |
| C26 | $X^2Y^4$ | -2.63245E-13 | 9.07128E-11 | 1.92767E-09 |
| C27 | $XY^5$ | -2.27532E-14 | -4.81643E-11 | -9.04589E-11 |
| C28 | $Y^6$ | 4.29901E-13 | 6.70496E-09 | 4.89293E-09 |
| C29 | $X^7$ | -9.92937E-18 | -3.80522E-11 | 7.89261E-11 |
| C30 | $X^6Y$ | 1.43644E-16 | -2.24322E-11 | -7.51854E-11 |
| C31 | $X^5Y^2$ | 8.32897E-17 | -1.06052E-11 | -1.77495E-10 |
| C32 | $X^4Y^3$ | 1.69536E-15 | 1.18683E-10 | 4.75422E-11 |
| C33 | $X^3Y^4$ | -7.18311E-16 | 5.22630E-11 | 6.57814E-11 |
| C34 | $X^2Y^5$ | 6.69602E-15 | 2.04295E-10 | 1.77114E-10 |
| C35 | $XY^6$ | -3.50957E-15 | 7.66079E-12 | 6.85434E-12 |
| C36 | $Y^7$ | 2.95648E-15 | -5.89419E-11 | -8.29176E-11 |
| C37 | $X^8$ | | 1.93129E-12 | -5.23923E-13 |
| C38 | $X^7Y$ | | 2.28439E-13 | 2.70843E-12 |
| C39 | $X^6Y^2$ | | 5.59374E-13 | 3.75078E-12 |
| C40 | $X^5Y^3$ | | -6.00324E-13 | -5.70745E-13 |
| C41 | $X^4Y^4$ | | 2.12926E-12 | -2.00044E-12 |
| C42 | $X^3Y^5$ | | -7.62606E-14 | -1.08137E-12 |
| C43 | $X^2Y^6$ | | 5.52614E-12 | 4.16752E-12 |
| C44 | $XY^7$ | | 4.49394E-13 | 2.21034E-13 |
| C45 | $Y^8$ | | -1.72151E-12 | -1.61035E-12 |
| C46 | $X^9$ | | -9.78105E-15 | 1.76712E-14 |
| C47 | $X^8Y$ | | 1.72582E-14 | -1.43003E-14 |
| C48 | $X^7Y^2$ | | 1.42340E-14 | -4.77748E-15 |
| C49 | $X^6Y^3$ | | -1.04208E-14 | 3.58937E-15 |
| C50 | $X^5Y^4$ | | -3.88607E-14 | -2.17797E-14 |
| C51 | $X^4Y^5$ | | 1.47400E-14 | -3.22415E-14 |
| C52 | $X^3Y^6$ | | 1.11578E-14 | -1.47651E-14 |
| C53 | $X^2Y^7$ | | 3.96548E-14 | 2.74187E-14 |
| C54 | $XY^8$ | | -7.34625E-15 | -5.40705E-15 |
| C55 | $Y^9$ | | -2.09084E-15 | -3.42570E-15 |

FIG. 22
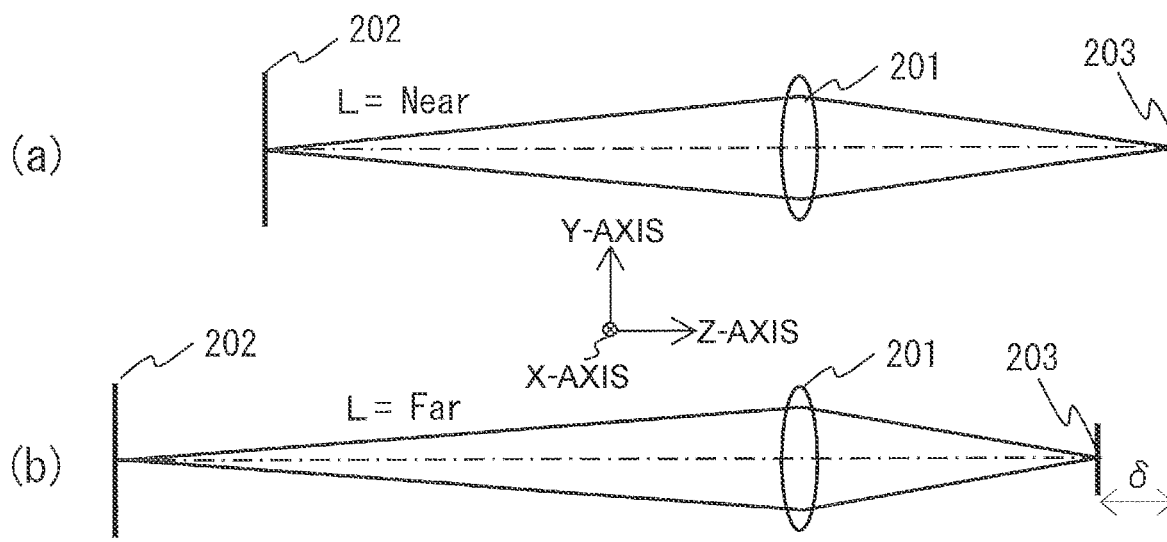
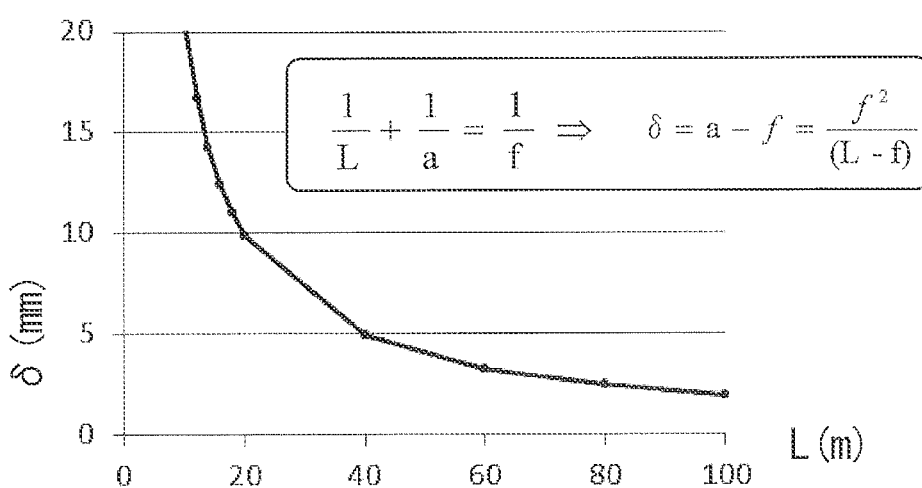
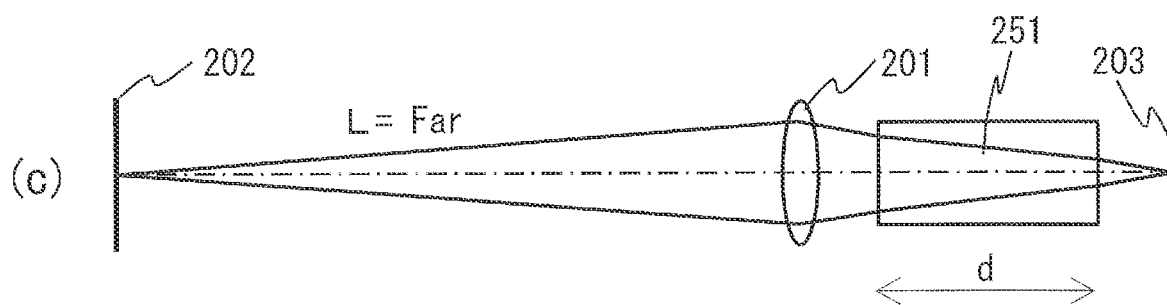

FIG. 23
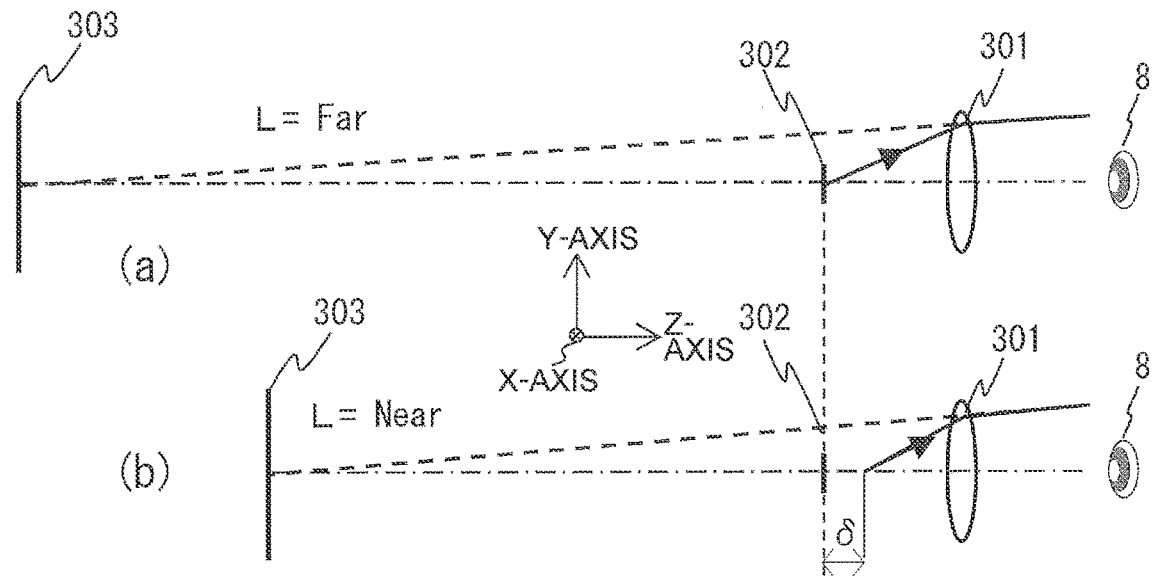
(a)
(b)
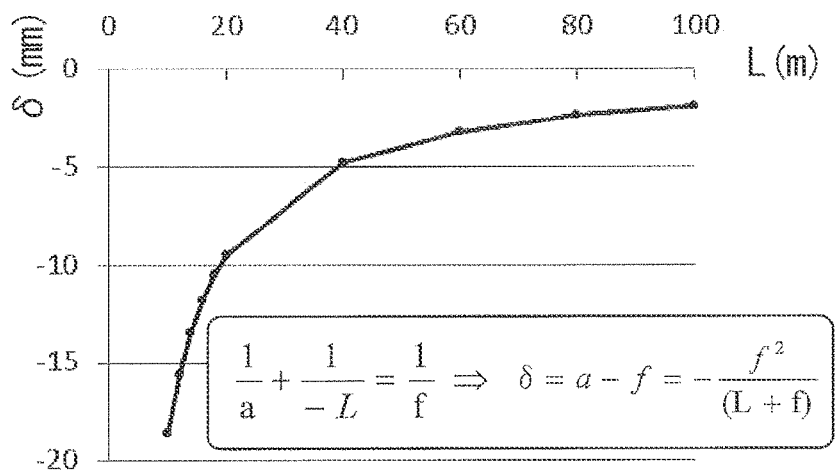
(c)

PROJECTION OPTICAL SYSTEM AND HEAD-UP DISPLAY DEVICE

TECHNICAL FIELD

The present invention relates to a projection optical system and a head-up display device using it, and relates specifically to a projection optical system and a head-up display device using it in which an image is projected to a windshield in an automobile, an airplane, and the like and it is configured that the image is observed as a virtual image through the windshield.

BACKGROUND ART

As a technology according to a head-up display device, in Patent Literature 1, there is disclosed a configuration of "The head-up display device is equipped with: a transmission type liquid crystal display panel; a backlight radiating light to the back of the liquid crystal display panel; and a projection optical system enlarging and projecting an image displayed on the liquid crystal display panel. The projection optical system comprises a relay lens and a projection lens (ocular optical system). The relay lens is constituted to efficiently use telecentric display light by satisfying some conditions, and forms a real image by enlarging the image displayed on the liquid crystal display panel. The projection lens enlarges the real image further and projects it to a windshield of an automobile to display the virtual image for a driver (excerption of the abstract)".

In the head-up display device of this Patent Literature 1, values of various measuring instruments such as the speed meter, tachometer, water temperature meter, fuel gage, and the like are displayed by a virtual image at 2 m forward of the driver. Thus, because the difference between the visual direction of viewing the values of the various measuring instruments by a virtual image and the visual direction of the foreground viewed by the driver becomes small, the time taken for moving the line of sight between these 2 visual directions can be shortened.

Also, because the distance to the virtual image (2 m forward) is closer to the distance to the foreground viewed by the driver compared to the distance of directly viewing various measuring instruments and the like, the time required for focusing the eyes between a state where the eyes are focused on an object in the foreground and a state where the eyes are focused on the virtual image can be also shortened.

With these 2 advantages, it can be expected to improve safety in driving an automobile by the head-up display device.

However, because the foreground of the driver is not a two-dimensional plane surface but a three-dimensional space, there is a problem that, when information according to an object having a different distance from the eyes of the driver is displayed on the same virtual image plane, the line of sight distance of the object and the displayed information differs, and it takes time further for focusing the eyes.

Therefore, in Patent Literature 2, there is disclosed a configuration of "By disposing the first screen and the second screen at positions shifted from each other on the optical path, respective virtual images are formed at different distances from the driver, and by disposing a variable focus lens, an image is focused in a state where image light is focused by the first screen or the second screen. As the variable focus lens, separately from a projection lens, a liquid lens for changing the focal length and a concave mirror configured to be capable of changing the laser beam and the curvature are driven (excerption of the abstract)".

According to the head-up display device of this Patent Literature 2, because the virtual image can be formed at different distances from the driver, a virtual image plane close to the distance of an object in the foreground of the driver can be selected. Therefore, the time required for focusing the eyes in a state where the eyes are focused on the object in the foreground of the driver and a state where the eyes are focused on the virtual image can be shortened further.

CITATION LIST

Patent Literature

PATENT LITERATURE 1: JP-A No. 2009-229552
PATENT LITERATURE 2: JP-A No. 2015-034919

SUMMARY OF INVENTION

Technical Problem

In the head-up display device example disclosed in Patent Literature 1, it is configured that the picture light displayed on the liquid crystal display panel is mapped as a real image (Ir of FIG. 2 of Patent Literature 1) by the relay optical system, and that the virtual image (Iv of FIG. 2 of Patent Literature 1) is observed through the ocular optical system (L1 of FIG. 2 of Patent Literature 1). With respect to the mapping relation, the picture light (plane surface) on the liquid crystal display panel is mapped on the real image Ir (plane surface), and the real image Ir (plane surface) is mapped on the virtual image Iv (plane surface).

However, the foreground of the driver is not a two-dimensional plane surface but a three-dimensional space. Therefore, the line of sight from the driver getting on an automobile (own vehicle) and the distance to the foreground will be explained using FIG. 20.

In a field of view (Fov) as the foreground viewed by the driver of the own vehicle 101, there exist a preceding vehicle 102 traveling in front, a road surface 105 before the preceding vehicle 102 (for example whether there is a fallen object on the road surface and so on), a bicycle running nearby at the side of the road, a pedestrian on the sidewalk, and so on.

Although a line of sight 103 for viewing the preceding vehicle 102 traveling in front becomes a direction of slightly lowering the line of sight from the front direction, a line of sight 104 for viewing the road surface 105 before the preceding vehicle 102 on the road becomes a direction of further lowering the line of sight. Thus, it is known that the distance to an object to be watched out by the driver during driving differs according the line of sight.

Therefore, in order to further improve safety of driving of an automobile, it is important to shorten the time for focusing the eyes by bring the distance to an object gazed during driving and the distance to a virtual image displayed then closer.

Further, in the head-up display device example disclosed in Patent Literature 2, although it is configured that a virtual image is formed at different distances from the driver, it is indispensable to select the screen according to the displayed content and to carry out focusing of the variable focus lens quickly according to the selected screen. Also, as the variable focus lens, "a liquid lens changing the liquid interface of the liquid sealed within a container" or "a concave mirror configured to be capable of changing the curvature" and so on are used, the head-up display device becomes large, and the cost increases. Further, because the head-up display device is mounted on an automobile and is used, vibration during traveling is transferred to the head-up display device also. Here, according to Patent Literature 2, because focusing is carried out using a movable unit such as a variable focus lens, it is concerned that vibration during traveling affects the movable unit and focusing is not carried out sufficiently.

Further, although such circumstance possibly occurs during driving that display with respect to the preceding vehicle by a virtual image and display with respect to the fallen object on the road surface by a virtual image are preferably displayed simultaneously, in the head-up display device of Patent Literature 2, such problem remains unsolved that, in displaying virtual images at different distances, the virtual image can be displayed only alternatively.

The present invention has been achieved in view of the circumstances described above, and its object is to provide a projection optical system and a head-up display capable of displaying virtual images with different point of view distances simultaneously while reducing effects of vibration during driving of an automobile.

Solution to Problem

In order to solve the problem described above, a projection optical system according to the present invention is a projection optical system including an ocular optical system that displays a virtual image by reflecting light emitted from an image forming unit that emits light including image information, in which the ocular optical system at least includes a spherical lens, a free-form curved surface lens, and a free-form curved surface mirror, and the ocular optical system is configured to arrange a first small lens system and a second small lens system in a space on the ocular optical system side of a plane conjugate with a virtual image plane side by side along the conjugate plane, the first small lens system achieving first focus position movement, separated light of the light emitted from the image formation unit being incident upon the first small lens system, the second small lens system achieving second focus position movement shorter than the first focus position movement, separated light of the light emitted from the image formation unit being incident upon the second small lens system.

Also, a head-up display device according to the present invention is characterized to include an image forming unit and the projection optical system, the image forming unit emitting light including image information.

Advantageous Effect of Invention

According to the present invention, it is possible to provide a projection optical system and a head-up display capable of displaying virtual images with different point of view distances simultaneously while reducing effects of vibration during driving of an automobile. Also, problems, configurations and effects other than those described above will be clarified by explanation of embodiments described below.

BRIEF DESCRIPTION OF DRAWINGS

FIG. 4 is an enlarged view of a separated optical path according to the first embodiment.

FIG. 5 is a drawing that shows lens data of the ocular optical system according to the first embodiment.

FIG. 6 is a drawing of free-form curved surface factors of the ocular optical system according to the first embodiment.

FIG. 13 is an enlarged view of a separated optical path according to the second embodiment.

FIG. 14 is a drawing that shows lens data of the ocular optical system according to the second embodiment.

FIG. 15 is a drawing of free-form curved surface factors of the ocular optical system according to the second embodiment.

FIG. 22 is a drawing for explaining the mapping relation in the real image optical system and an action of the step filter.

FIG. 23 is a drawing for explaining the mapping relation in the virtual image optical system and an action of the step filter.

DESCRIPTION OF EMBODIMENTS

Hereinafter, an embodiment and various examples of the present invention will be explained using the drawings and the like. Explanations below show concrete examples of the content of the present invention, the present invention is not limited to these explanations, and various alterations and amendments by a person with an ordinary skill in the art can be effected within the range of the technical thoughts disclosed in the present description. Also, in all drawings for explaining the present invention, those having the same function are marked with the same reference sign, and there is a case of omitting repeated explanation for them.

Figure 19:
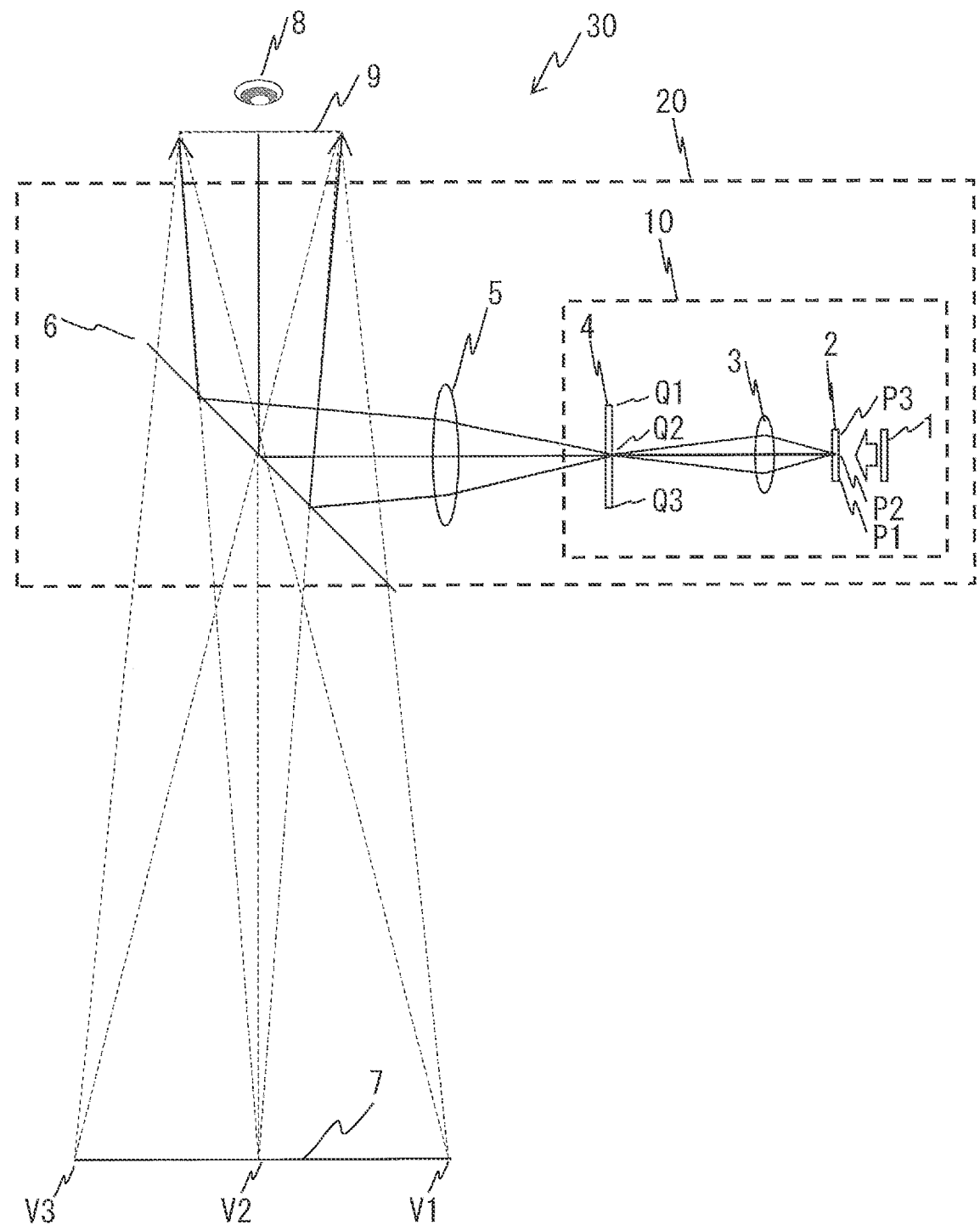
FIG. 19 is a schematic configuration drawing of a head-up display device.
Figure 20:
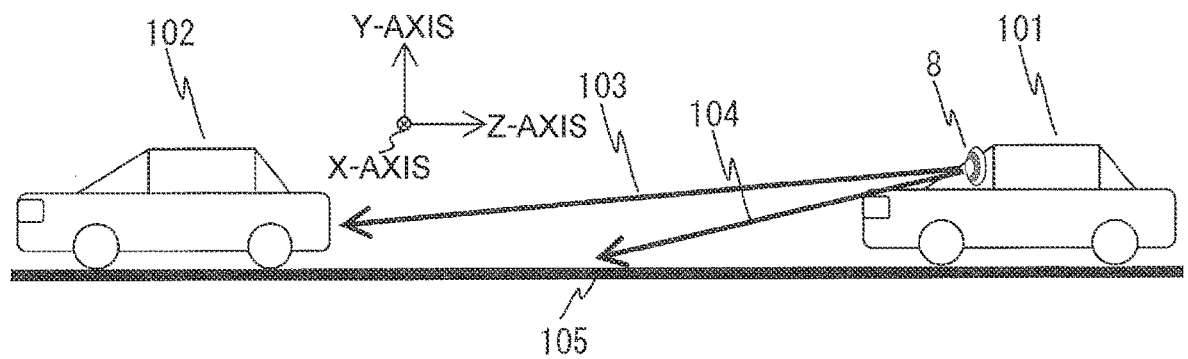
FIG. 20 is a drawing for explaining the difference in the viewing direction of the driver and the distance along the viewing direction.

The basic configuration of a head-up display device will be explained using FIG. 19. FIG. 19 is a schematic configuration drawing of a head-up display device.

A head-up display device 30 shown in FIG. 19 has such configuration that picture light emitted from a projection optical system 20 including an image forming unit 10 and an ocular optical system 5 is made to be reflected by a windshield 6 of an automobile (not illustrated) and is made to be incident on eyes 8 of the driver.

To be more specific, a light flux radiated from a backlight 1 to a liquid crystal display panel 2 is made to be incident on a relay optical system 3 as a picture image light flux including picture information displayed on the liquid crystal display panel 2. By a focusing function of the relay optical system 3, the picture information on the liquid crystal display panel 2 is enlarged and is enlargingly projected onto a screen plate (diffusion plate) 4. Points P1, P2, P3 on the liquid crystal display panel 2 correspond to points Q1, Q2, Q3 of the screen plate (diffusion plate) 4 respectively. By employing the relay optical system 3, a liquid crystal display panel with small display size can be used. Since the backlight 1, the liquid crystal display panel 2, the relay optical system 3, and the screen plate (diffusion plate) 4 form image information (picture information) on the screen plate (diffusion plate) 4, these are collectively referred to as the image forming unit 10.

Next, the image information on the screen plate (diffusion plate) 4 is projected onto the windshield 6 by the ocular optical system 5, and the light flux reflected by the windshield 6 reaches the position of the eyes 8 of the driver. As viewed from the eyes of the driver, the relationship as if the image information of a virtual image plane 7 is viewed is established. The points Q1, Q2, Q3 on the screen plate (diffusion plate) 4 correspond to points V1, V2, V3 of the virtual image plane 7 respectively. Also, the range where the points V1, V2, V3 on the virtual image plane 7 can be seen even when the position of the eyes 8 is moved is an eye box 9. Thus, the ocular optical system is an optical system for displaying an image (virtual image) of an object (spatial image) in front of the eyes of the driver similarly to an ocular lens of a finder of a camera and an ocular lens of a microscope.

Also, the screen plate (diffusion plate) 4 is configured of a micro-lens array that is obtained by arraying micro-lenses two-dimensionally. Thereby, a diffusion action is caused, the spread angle of the light flux emitted from the screen plate 4 is enlarged, and the size of the eye box 9 is made a predetermined size. Also, the diffusion action of the screen plate (diffusion plate) 4 can be achieved also by incorporating diffusion particles.

Although it was explained in the background art, during driving, confirmation of the preceding vehicle (lighting of the brake lamp and right-turn/left-turn lamps), confirmation of the road surface of the road before the preceding vehicle (presence/absence of the fallen object, and so on), confirmation of the bicycle/pedestrian at the side of the road before the road surface, and so on are carried out.

Further, because the driver also confirms information of the speed meter, the fuel gage, and the like, by furnishing a head-up display device and displaying the information of various measuring instruments in front of the driver as a virtual image by the head-up display device, movement of the line of sight of the driver in confirming the measuring instruments becomes small, the time required for focusing the eyes can be shortened, and safety of driving can be improved.

In the meantime, with respect to the preceding vehicle in the foreground, the road surface before the preceding vehicle, and the bicycle/pedestrian at the side of the road before the road surface, because the distance from the driver is different, by changing the distance of the virtual image that displays the information related to them, the time required for focusing the eyes can be further shortened, and safety of driving can be further improved.

Figure 21:
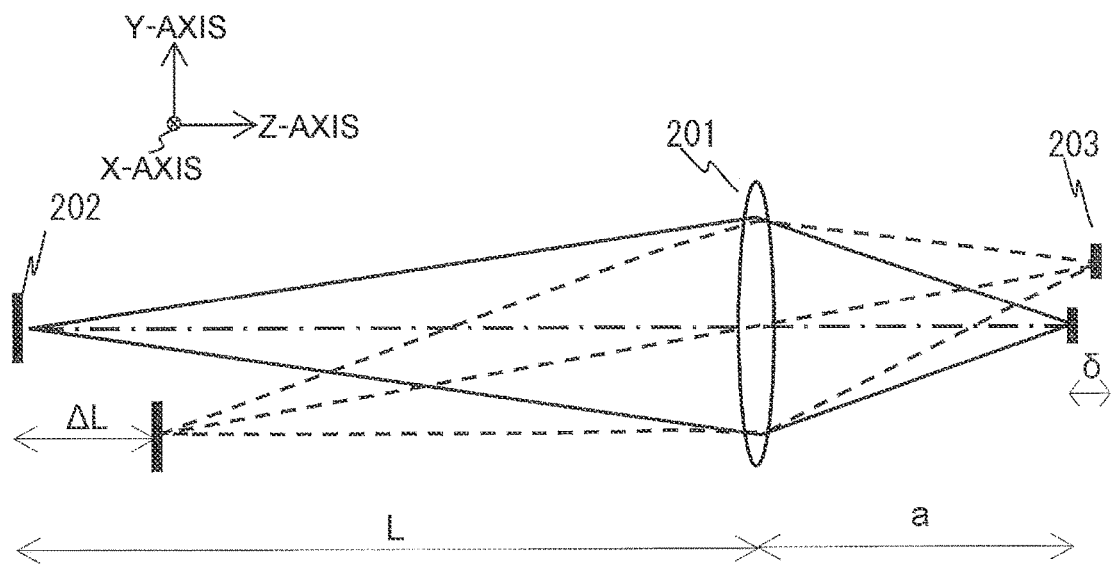
FIG. 21 is a drawing for explaining the mapping relation by the object distance and the image distance.

Next, the mapping relation by difference in the virtual image distance of the head-up display device will be sorted out using FIG. 21 to FIG. 23, and the problems to be solved will be shown quantitatively.

FIG. 21 is a drawing for explaining the mapping relation by the object distance and the image distance (in the real image optical system). Because of reduction of the distance L from a focus lens 201 to an object plane 202 by ΔL, the distance a to a real image plane 203 increases by δ. FIG. 22 is a drawing for explaining the mapping relation in the real image optical system and an action of the filter, and the moving amount δ of the focus position when focal length=440 mm and object distance L=100 to 10 m is shown. In the real image optical system, the focal position on the near distance side is distant compared to the focal position on the far distance side. Here, when a filter 251 having the thickness d and the refractive index N is arranged between the focus lens 201 and the real image plane 203, the position of the real image plane 203 can be made apart by a portion of d(1−1/N) which is the difference of the physical length d and the optical length d/N of the filter 251. This amount becomes the focus position movement amount in a case of the filter only. In the real image optical system, because the real image plane position on the near distance side is distant compared to the real image plane position on the far distance side, by arranging the filter 251 between the focus lens 201 and the real image plane 203 on the optical path on the far distance side, it is possible to arrange the physical real image plane position on the near distance side and the physical real image plane position on the far distance side on the same plane surface.

In a similar manner, FIG. 23 is a drawing for explaining the mapping relation in the virtual image optical system and an action of the filter, and the moving amount δ of the object position when focal length=440 mm and virtual image distance L=100 to 10 m is shown. In the virtual image optical system, the object position on the far distance side is distant compared to the object position on the near distance side. In a similar manner, when a filter 351 having the thickness d and the refractive index N is arranged between an ocular lens 301 and an object plane 302, the position of the object plane 302 can be made apart by a portion of d(1−1/N) which is the difference of the physical length d and the optical length d/N of the filter 351. This amount becomes the focus position movement amount in a case of the filter only. In the virtual image optical system, because the object plane position on the far distance side is distant compared to the object plane position on the near distance side, by arranging the filter 351 between the ocular lens 301 and the object plane 302 on the optical path on the near distance side, it is possible to arrange the physical object plane position on the near distance side and the physical object plane position on the far distance side on the same plane surface. In FIG. 23, in a case of virtual image distance L=100 to 14 m for example, because the position of the object plane 302 shifts by δ=11.5 mm, in a case of N=1.84999 (FDS90), the filter 351 having d=δ/(1−1/N)=25.0 mm becomes necessary. In a similar manner, in a case of virtual image distance L=100 to 10 m, because the position of the object plane 302 shifts by δ=16.6 mm, in a case of N=1.84999 (FDS90), the filter 351 having d=36.2 mm becomes necessary.

In the meantime, when the filter 351 is thick, because the spread of the light flux emitted from the object plane 302 becomes large, it becomes hard to arrange the filter 351 only in a part of the optical path. Therefore, a method of moving the focus position (the object plane 302) in addition to insertion of the filter 351 (or instead of the filter 351) is possible. This method of moving the focus position different from the filter 351 will be explained using FIG. 24.

Figure 24:
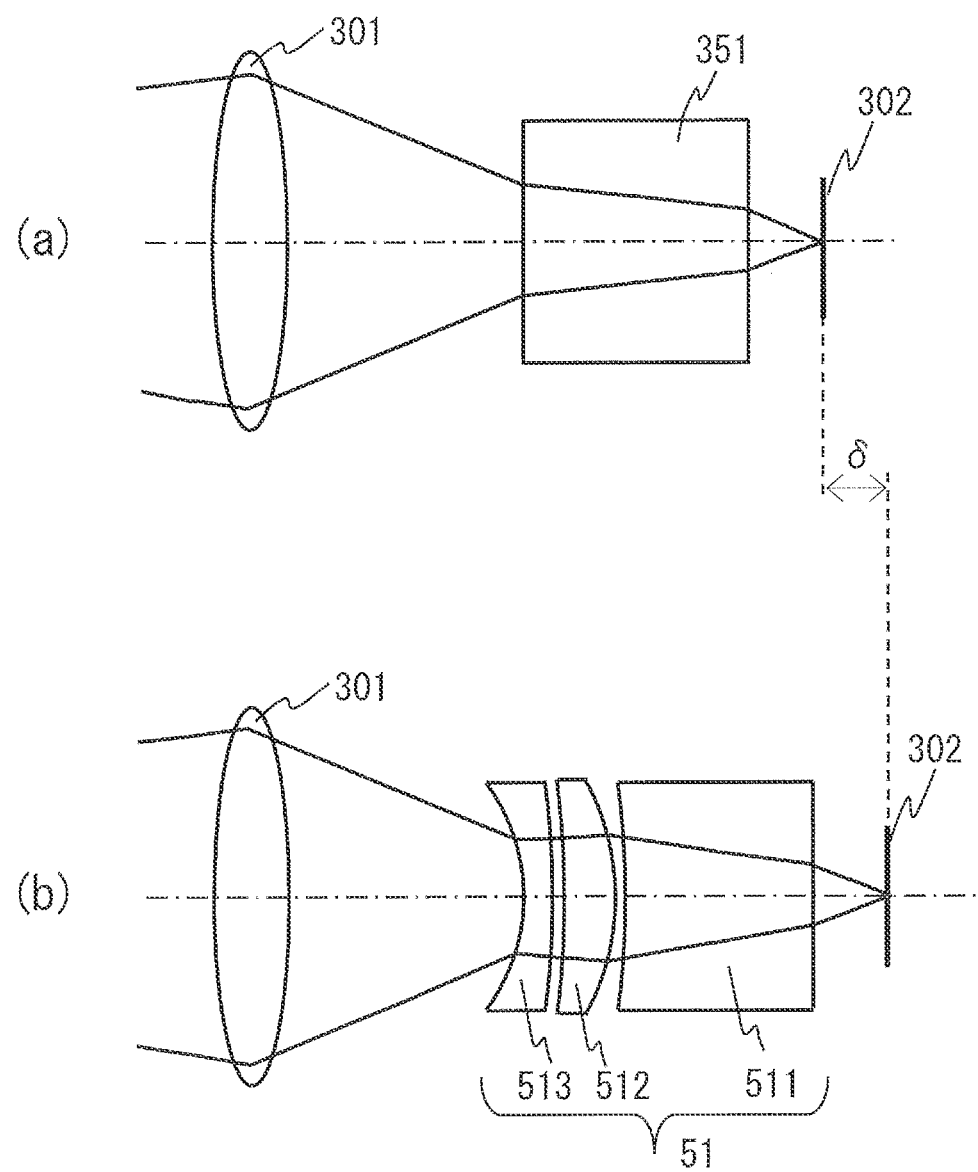
FIG. 24 is a drawing for explaining an action by the small lens system.

FIG. 24 is a drawing for explaining an action by the small lens system. Although the focus plane (the object plane 302) is moved by insertion of the filter 351 in FIG. 24 (a), in order to move the focus plane (the object plane 302) further, a part of the filter 351 is substituted to a lens (small lens) in FIG. 24 (b). In FIG. 24 (b), the light beam is sprung up upward by a first small lens 513 (concave lens), and the beam angle is restored by a next small lens 512 (convex lens).

Here, both of the small lens 513 (concave lens) and the small lens 512 (convex lens) are made meniscus lenses that direct the concave surface to the expansion side. This shape avoids interference of the small lens 513 and the small lens 512, and allows close arrangement. Further, because the surface on the expansion side of a small lens 511 (concave lens) also has a shape of directing the concave surface to the expansion side in a similar manner, close arrangement of the small lens 512 and the small lens 511 is also allowed. The small lens 511 (concave lens), the small lens 512 (convex lens), and the small lens 513 (concave lens) correspond to the first small lens system that achieves the first focus movement.

When the lenses are arranged in such shape that the concave surfaces face each other, the air gap between them becomes large so as to prevent interference of the lenses. As a result, the thickness of the medium of the filter 351 becomes small, and the effect of movement of the focus position (the object plane 302) explained in the filter system deteriorates.

Next, the first embodiment of the projection optical system will be explained which uses a free-form curved surface lens and a free-form curved surface mirror having a rotationally asymmetric shape capable of achieving an optical system where, with respect to plural virtual image planes whose field of view and virtual image distance are different from each other, the object plane position of each of them falls on the same plane surface.

First Embodiment

Figure 1:
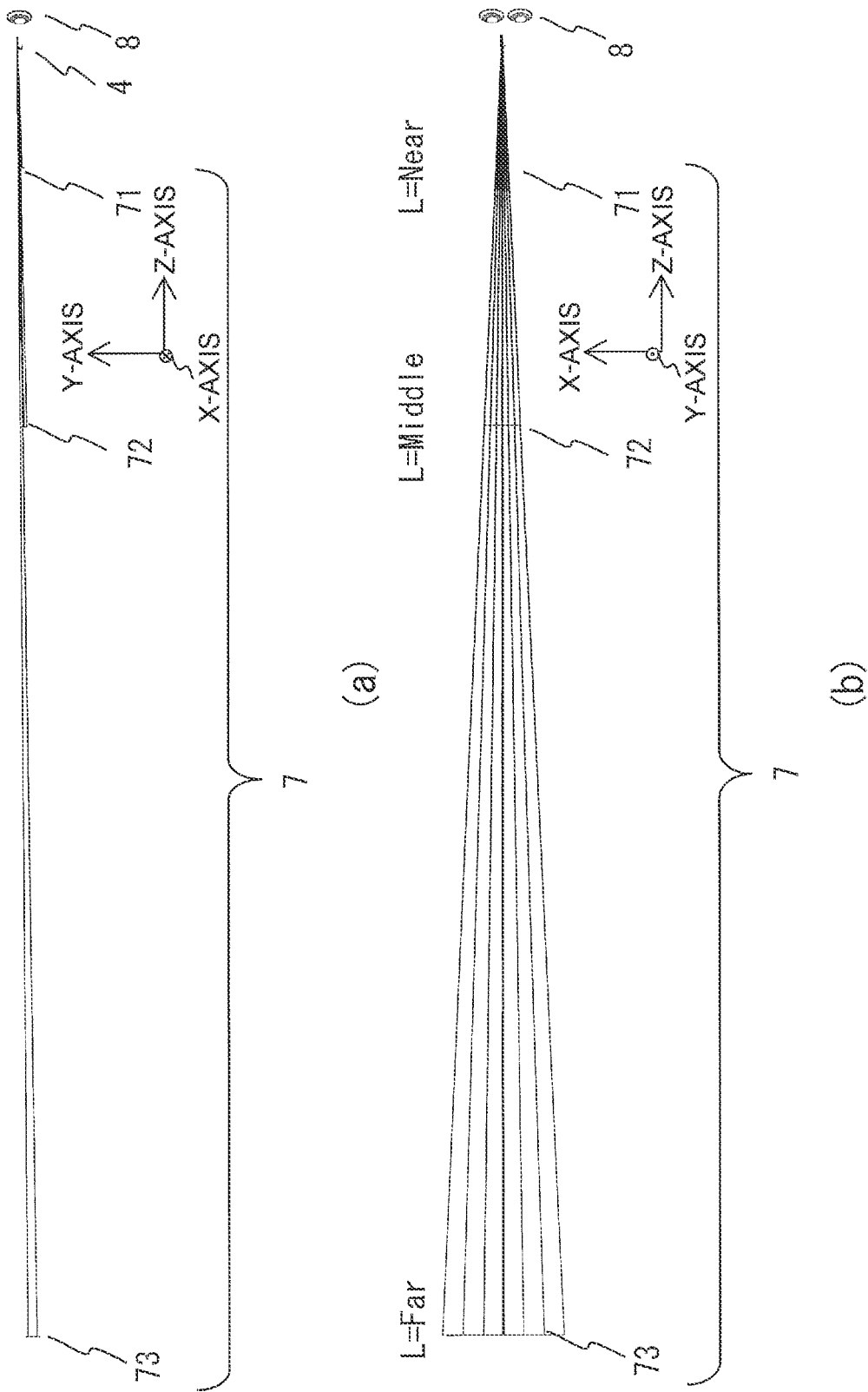
FIG. 1 is a total ray diagram of an ocular optical system of the first embodiment, (a) expresses a state where the picture information of the virtual image plane is viewed by the eyes of the driver in YZ plane, and (b) expresses a state where the picture information of the virtual image plane is viewed by the eyes of the driver in XZ plane.

The first embodiment is characterized particularly in the shape of the virtual image plane 7 and the configuration on the object plane side in the head-up display device 30 of FIG. 19. In this regard, the shape of the virtual image plane 7 will be explained referring to FIG. 1. FIG. 1 is a total ray diagram of the ocular optical system 5 of the first embodiment, (a) expresses a state where the visual information of the virtual image plane 7 is viewed by the eyes of the driver in YZ plane, and (b) expresses a state where the visual information of the virtual image plane 7 is viewed by the eyes of the driver in XZ plane. The right eye and the left eye overlap each other in YZ plane (refer to the reference sign 8), and the right eye and the left eye are seen separately in XZ plane. Here, the driver corresponds to an observer of a virtual image positioned on the side where light is incident on the virtual image plane.

The virtual image plane 7 is configured of 3 virtual image planes 71, 72, 73 whose virtual image distance changes in a line of sight relative to the line of sight of the front of the driver. The function is achieved by viewing the picture light on the screen plate (diffusion plate 4) arranged on the same plane surface by the ocular optical system 5 with respect to the virtual image plane 71 with the virtual image distance 10 m in the range of 1.8 to 2.2 degrees of the line of sight relative to the line of sight of the front, the virtual image plane 72 with the virtual image distance 30 m in the range of 0.97 to 1.37 degrees of the line of sight, and the virtual image plane 73 with the virtual image distance 100 m in the range of 0.4 to 0.8 degrees of the line of sight. Also, the detail of the field of view will be supplemented in explanation of the distortion property of FIG. 7 and FIG. 8.

Figure 2:
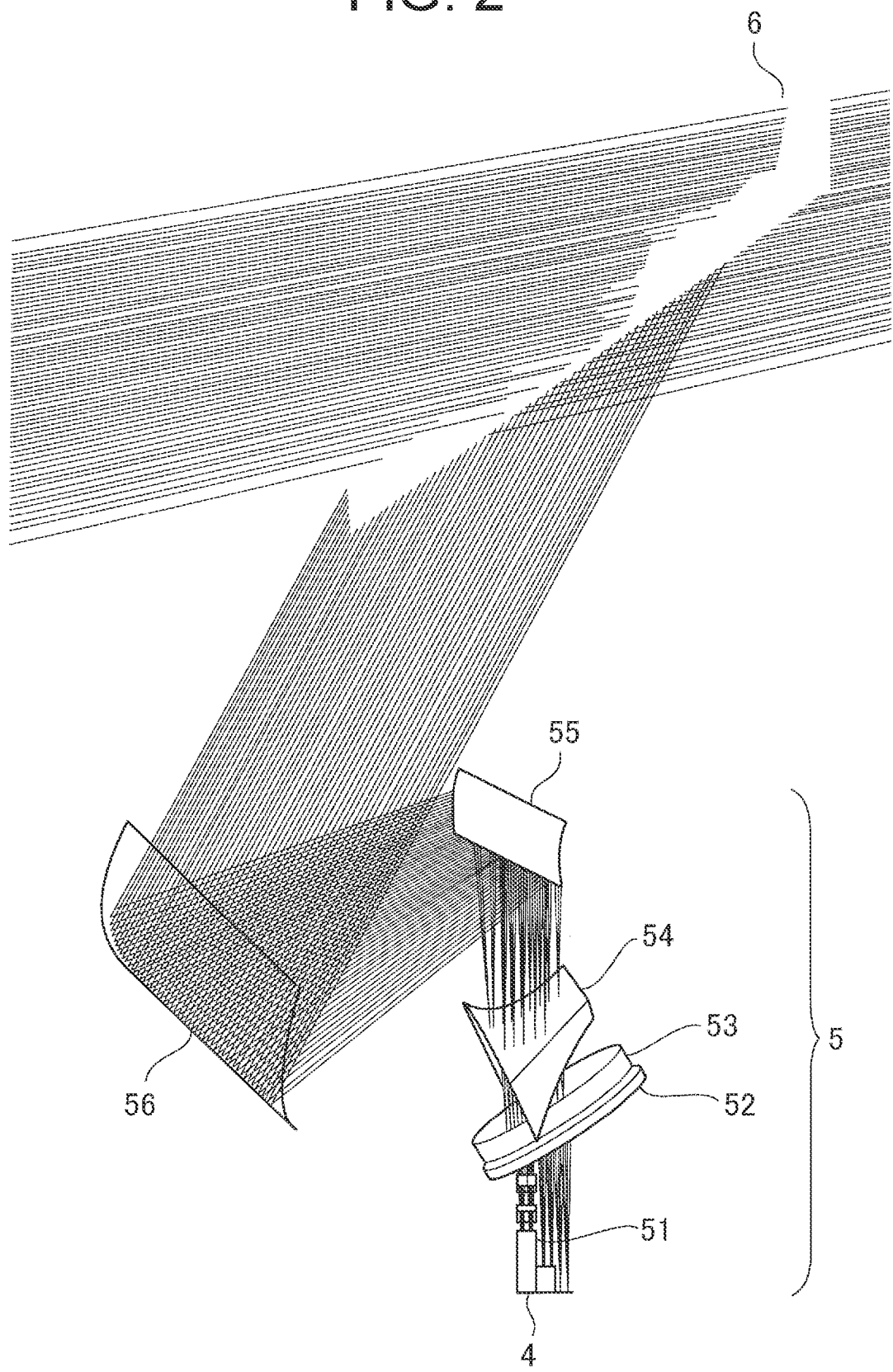
FIG. 2 is an enlarged view of an essential part of the ocular optical system of the first embodiment.
Figure 3:
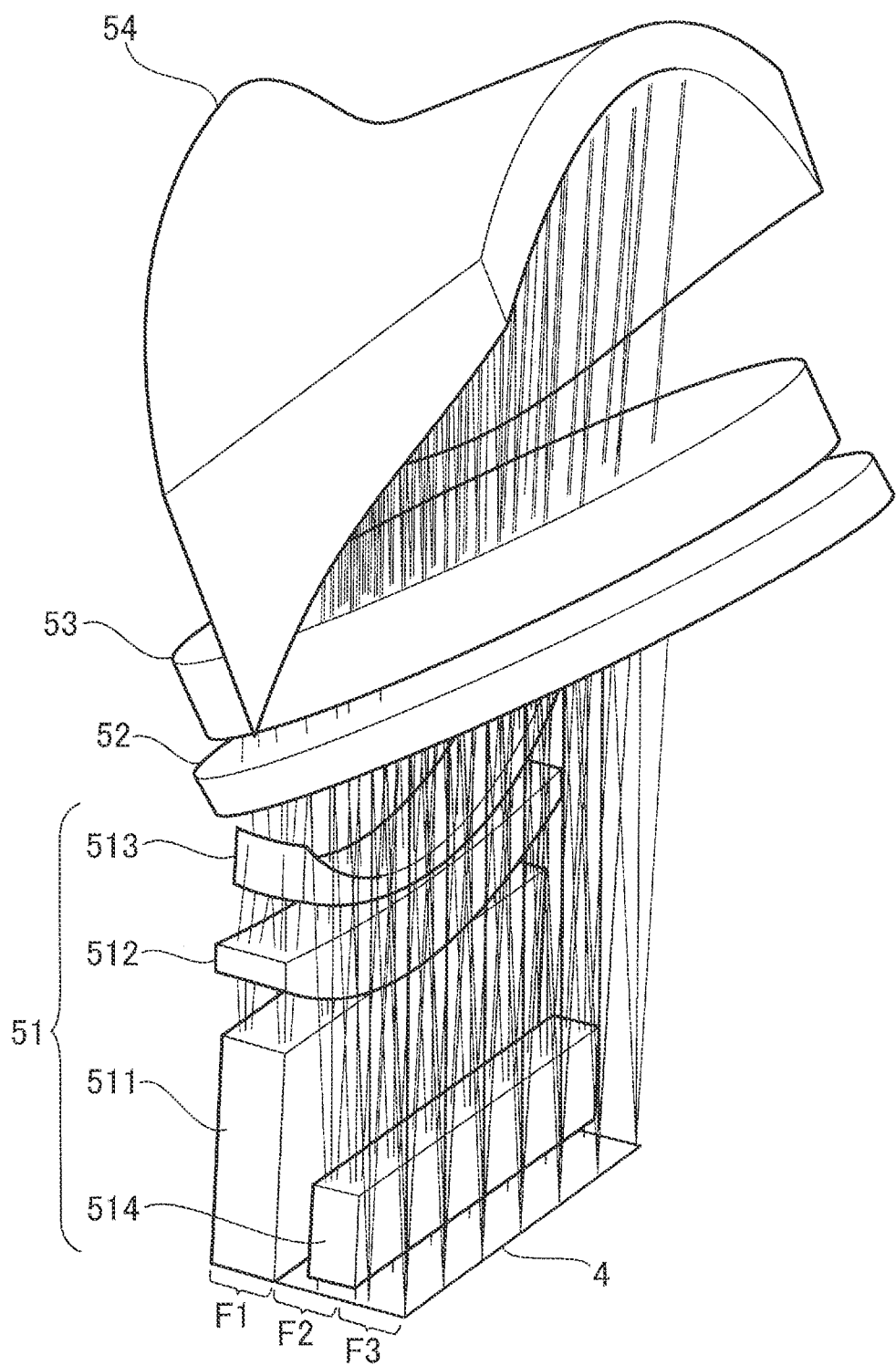
FIG. 3 is a perspective enlarged view of a lens unit of the ocular optical system according to the first embodiment.

FIG. 2 is an enlarged view of an essential part of the ocular optical system of the first embodiment. FIG. 3 is a perspective enlarged view of a lens unit of the head-up display device according to the first embodiment. As shown in FIG. 2 and FIG. 3, the ocular optical system 5 is configured so as to arrange, side by side, a small lens system 51, a convex lens 52 with positive refractive power, a concave lens 53 with negative refractive power, a rotationally asymmetric free-form curved surface lens 54, a reflecting mirror 55, and a rotationally asymmetric free-form curved surface mirror 56 in front of the windshield 6 in this order from the screen plate (diffusion plate) 4 side. By arranging the free-form curved surface mirror 56 and the reflecting mirror 55 so as to face each other, the optical path is bent into a Z-shape, and compactization of the head-up display device is achieved. The reflecting mirror 55 is a spherical mirror. The free-form curved surface lens 54 has a rotationally asymmetric shape, and has an action of correcting trapezoidal distortion. The convex lens 52 and the concave lens 53 have large eccentricity (no eccentricity in the front-rear direction). The total thickness of the glass material of the small lens system 51 was reduced in the order of an optical path F1 whose virtual image distance was short, an optical path F2 whose virtual image distance was middle, and an optical path F3 whose virtual image distance was long. Further, although there exists the common screen plate (diffusion plate) 4 in FIG. 3, the thickness of the glass material of the small lens system 51 in the optical path F3 is 0 mm. Furthermore, the small lens system 51 also includes a filter 514 that is arranged in the optical path F2. Here, the filter 514 corresponds to the second small lens system whose focus movement amount is less than that of the first small lens system (the small lens system including the small lenses 511, 512, 513).

FIG. 4 is an enlarged view of a separated optical path according to the first embodiment. Since the lens data are arranged so as to attain a reduction optical system, the light flux emitted from the virtual image planes 71, 72, 73 whose viewing direction and virtual image distance are different from each other passes through an optical path that is common from the eye box to the convex lens 52, and is thereafter divided before the screen plate (diffusion plate) 4. At the position where the optical flux is divided, the small lens system 51 is arranged. It is known that the light fluxes of respective optical paths F1, F2, F3 could be divided in this small lens system 51.

In general, although picture information is displayed in entire display region in TV and a projector, such using method is employed in a head-up display device that only required picture information is displayed at a required position. In driving an automobile, information on a preceding vehicle, information on the road surface along the way, information on a bicycle on both sides, and so on only have to be displayed in each viewing direction and at each distance.

Therefore, in FIG. 4, the picture information is not displayed at the positions of the screen plate (diffusion plate) 4 corresponding to the gaps between the optical paths F1, F2, and F3 corresponding to respective field of views, namely at the positions corresponding to the gaps between the optical paths F1, F2, and F3 in the liquid crystal display panel 2 that has a mapping relation with the screen plate (diffusion plate) 4. When the picture information is displayed also in the gap between the optical paths F1 and F2 corresponding to respective field of views, the picture light emitted from the positions corresponding to the optical paths F1 and F2 pass through both of the filter of the optical path F1 and the filter of the optical path F2, and therefore stray light such as a double image occurs in the virtual image plane.

Therefore, in order to make the ranges of the optical paths F1, F2, and F3 corresponding to respective field of views of FIG. 4 non-displaying regions where the picture information is not displayed, it is preferable to arrange band-shape light interception frames on the emission side of the screen plate (diffusion plate) 4 or the liquid crystal display panel 2 in addition to a band-shape black display on the liquid crystal display panel 2.

FIG. 5 is a drawing that shows lens data of the head-up display device according to the first embodiment. In the lens data shown in FIG. 5, the radius of curvature is expressed with a positive mark when the center position of the radius of curvature exists in the traveling direction, and the face-to-face distance expresses the distance on an optical axis from the apex position of each surface to the apex position of the next surface. The total thickness of the glass material of the small lens system 51 is 29.3 mm (=2+8+19.3) for the virtual image distance 10 m, the total thickness of the glass material of the small lens system 51 is 8.329 mm for the virtual image distance 30 m, and the total thickness of the glass material of the small lens system 51 is 0 mm for the virtual image distance 100 m.

Although d=36.2 mm of the glass material thickness (when the small lens system is configured of a filter single body, the filter thickness corresponds to the total thickness of the small lens system) was necessary in order to achieve the range L=100 to 10 m of the virtual image distance only by a filter in terms of the estimate values from FIG. 23, the total thickness of the glass material of the small lens system 51 of the first embodiment is d=29.3 mm which achieves thinning by approximately 20%. Thus, because the spread of the light flux in the small lens system 51 also becomes small, optical path interference between the optical paths with different virtual image distance can be prevented.

However, although the light flux emitted from the screen plate (diffusion plate) 4 depends on the spread and the diffusion property of the light flux that is made to be incident on the screen plate (diffusion plate) 4, the optical path interference described here is with respect to an effective light flux corresponding to an eye box size having been set.

"Eccentricity" represents a value in Y-axis direction, and "tilting" represents rotation around X-axis within YZ plane. "Eccentricity/tilting" is applied in the order of eccentricity and tilting at a surface in question. "Ordinary eccentricity" represents that a next surface is arranged at a position of the face-to-face distance on the new coordinate system where eccentricity/tilting have been applied. Eccentricity and tilting of "decenter & return" are applied only at the surface in question, and do not affect the next surface.

"PMMA" of the glass material name represents polymethyl methacrylate of a plastic, and "58.3" of the glass material name represents material having the refractive index 1.58 and Abbe's number 30.

FIG. 6 is a drawing of free-form curved surface factors of the head-up display device according to the first embodiment. The free-form curved surface factor of FIG. 6 is obtained by a formula (1) below.

[Formula 1]

$$Z = \frac{c \cdot (x^2 + y^2)}{1 + \sqrt{1 - (1+K)c^2 \cdot (x^2+y^2)}} + \sum\sum (Cj(m,n) \times x^m \times y^n) \quad (1)$$

$$j = [(m+n)^2 + m + 3n]/2 + 1$$

Here, a free-form curved surface shape is defined, in the coordinate space of XYZ axes (Z-axis=optical axis), by a rotationally symmetric component (circular cone member) defined by a circular cone constant K and curvature c (=inverse number of radius of curvature) and a rotationally asymmetric component (XY polynomial member) defined by a free-form curved surface factor $C_j$.

For example, when X is of the second order (m=2) and Y is of the third order (n=3), a factor of $C_{19}$ where j={(2+3)²+2+3×3}/2+1=19 corresponds. Also, the position of the optical axis of each of the free-form curved surface is determined by the amount of eccentricity/tilting in the lens data of FIG. 4.

Further, the anamorphic non-spherical surface factor of the head-up display device according to the first embodiment is obtained by a formula (2) below. However, the anamorphic non-spherical surface shape is a rotationally asymmetric shape, and is defined by the circular cone constant Kx and the curvature cux (=inverse number of radius of curvature) in XZ cross section and the circular cone constant Ky and the curvature cuy (=inverse number of radius of curvature) in YZ cross section in the coordinate space of XYZ axes (Z-axis=optical axis). With respect to cuy (=1/rdy) and cux (=1/rdx) in the formula (2), rdy=9,686 mm and rdx=5,531 mm in FIG. 5, and all of the other factors were made 0 (description was omitted).

[Formula 2]

$$Z = \frac{cux \cdot x^2 + cuy \cdot y^2}{1 + \sqrt{1 - (1+Kx)cux^2 \cdot x^2 - (1+Ky)cuy^2 \cdot y^2}} \quad (2)$$

Also, the values of the eye box size, field of view angle, and so on of the ocular optical system of the first embodiment are shown below in the order of the horizontal direction and the vertical direction.

Eye box size 100×50 mm

Effective size of picture light at screen plate 41.7× 15.4 mm

Field of view angle(full picture angle)5.4×1.8 degrees

Separated optical path (vertical viewing direction, virtual image size, virtual image distance)

F1 1.8 to 2.2 degrees, 943×70 mm, 10 m

F2 0.97 to 1.37 degrees, 2,830×210 mm, 30 m

F3 0.4 to 0.8 degrees, 9,432×698 mm, 100 m

Figure 7:
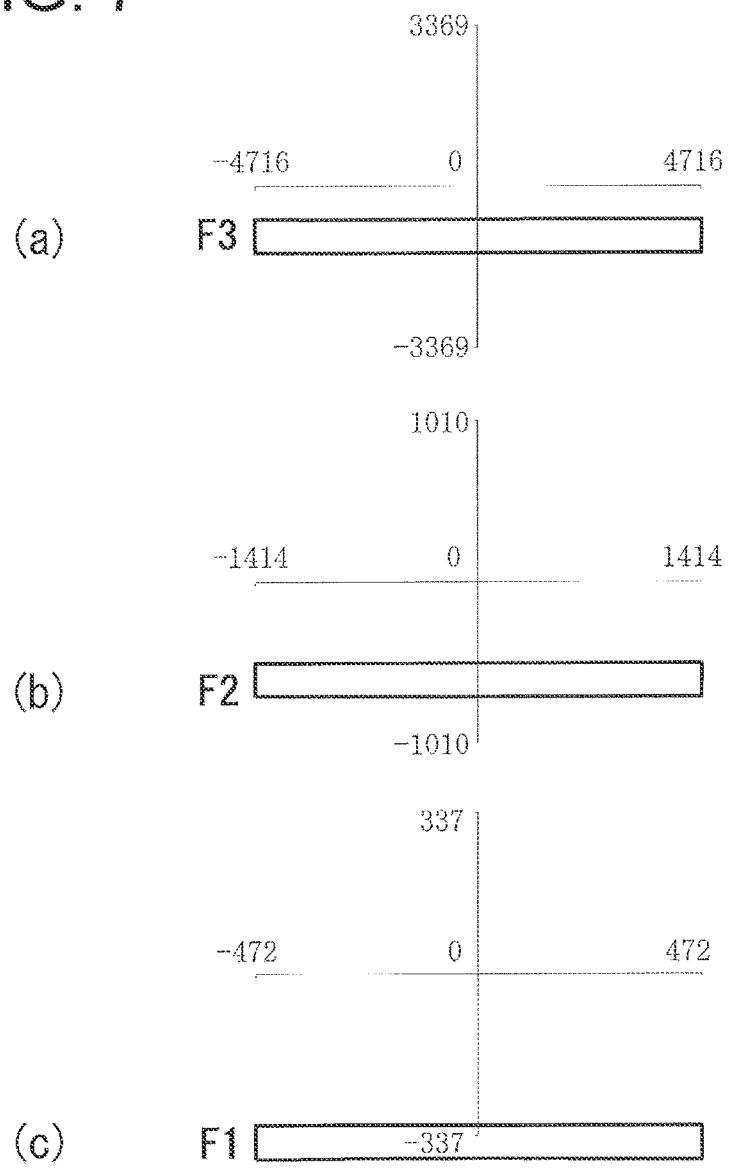
FIG. 7 is a drawing that expresses the distortion property of each separated optical path according to the first embodiment.
Figure 8:
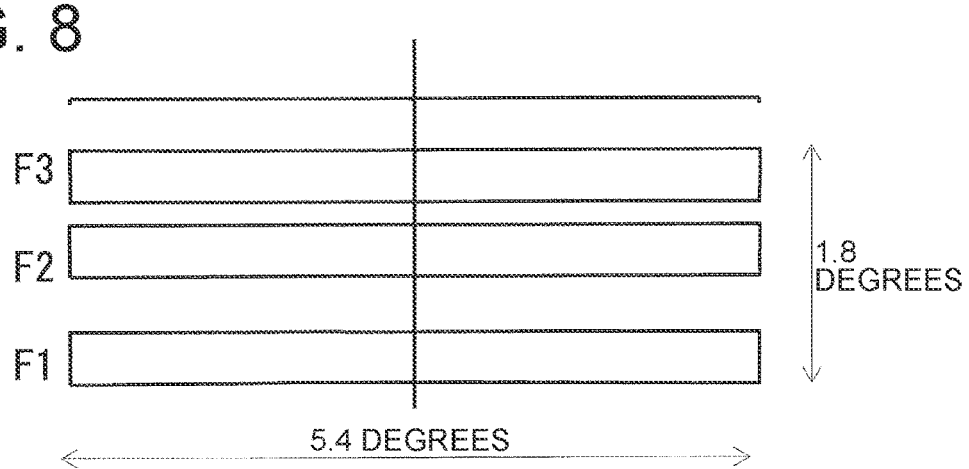
FIG. 8 is a drawing that expresses the total distortion property of the ocular optical system of the first embodiment.
Figure 9:
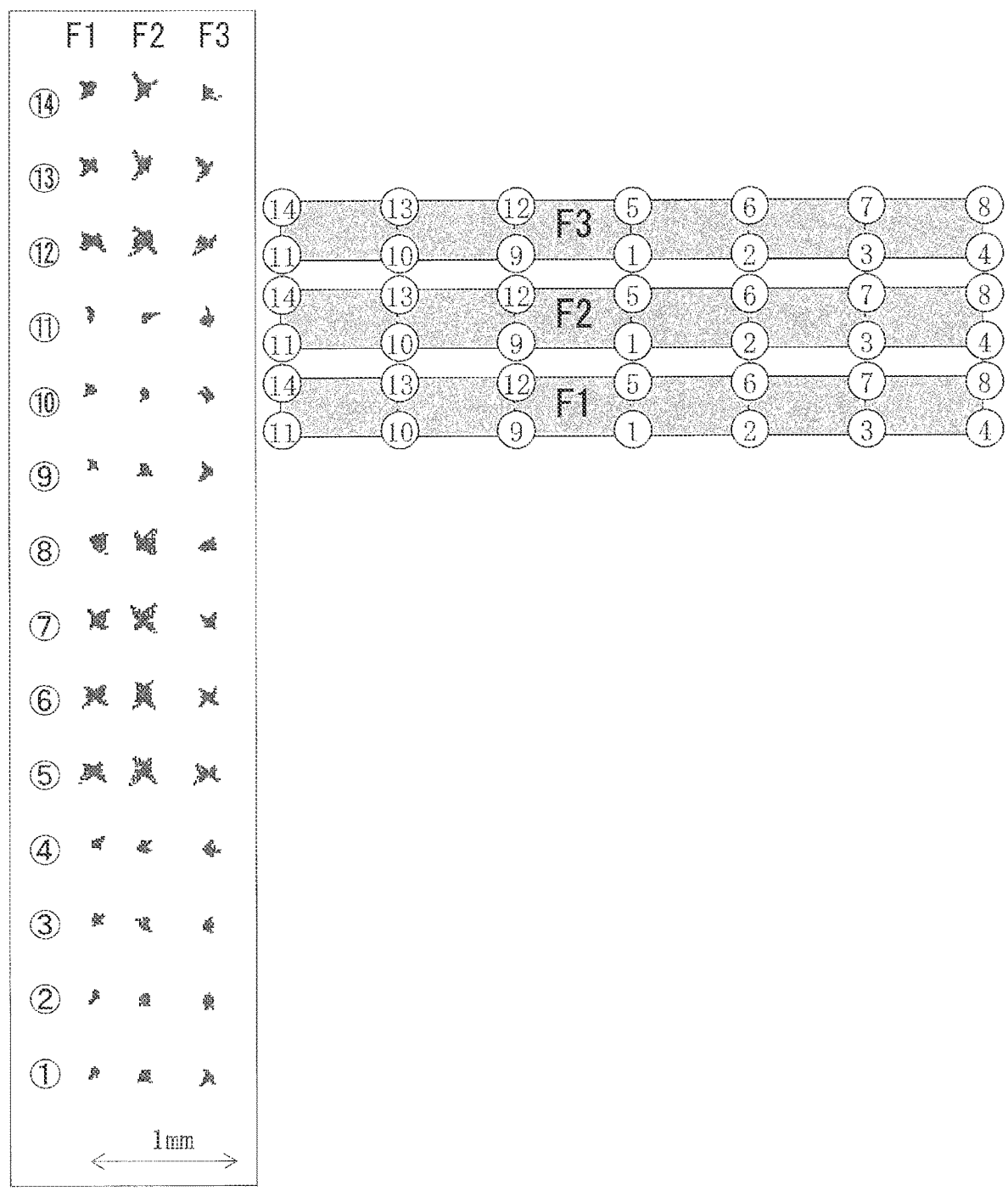
FIG. 9 is a spot diagram of the ocular optical system of the first embodiment.

Next, the optical performance of the first embodiment will be explained using FIG. 7 to FIG. 9. FIG. 7 and FIG. 8 are drawings that express the distortion property of the head-up display device of the first embodiment. FIG. 9 is a spot diagram of the head-up display device of the first embodiment.

FIG. 7 is a drawing that expresses the distortion property of each separated optical path according to the first embodiment in the virtual image planes 71, 72, 73, and it is known that a rectangular virtual image is achieved in each virtual image plane. When the field of view angle is calculated from the virtual image size in respective virtual image planes 71, 72, 73, the horizontal field of view angle (full picture angle) of the field of view F1 becomes 2×tan(943/2/10,000)=5.4 degrees, the horizontal field of view angle (full picture angle) of the field of view F2 becomes 2×tan(2,830/2/30,000)=5.4 degrees, and the horizontal field of view angle (full picture angle) of the field of view F3 becomes 2×tan(9,432/2/100,000)=5.4 degrees. Although the field of views at respective virtual image planes 71, 72, 73 are collectively expressed in FIG. 8 because the field of view angle in the horizontal direction in each virtual image plane 71, 72, 73 has the same value, it is known that respective field of views F1, F2, F3 are displayed at positions shifted in the vertical direction.

FIG. 9 shows a spot diagram obtained by arranging object points at the virtual image planes 71, 72, 73 respectively and calculating the spot diagram at the screen plate 4, and excellent optical performance has been achieved. Also, this spot diagram is for the total light flux of a case where the size of the eye box 9 is 100 mm horizontal×50 mm vertical. In the case of a virtual image viewed by an actual driver, the spot diagram in the size of the pupil of the eye of a human being (said to be 7 mm in diameter at maximum) is substantially improved compared to FIG. 9.

According to the present embodiment, the light flux emitted from the image forming unit 10 is divided and is made to be incident on the small lens system 51. Here, the small lens system 51 includes the first small lens system and the second small lens system having different focus position movement amount. Also, because the virtual image distance from the virtual image plane formed by the separated light having passed through the first small lens system to the driver and the virtual image distance from the virtual image plane formed by the separated light having passed through the second small lens system to the driver are different from each other, the position of the virtual image plane formed by the separated light having passed through each of the first small lens system and the second small lens system can be changed. Further, because the virtual image plane formed by the separated light having passed through each of the first small lens system and the second small lens system is formed at the different position of the field of view of the driver, the virtual image plane can be divided within the field of view.

Also, because respective small lenses configuring the small lens system 51 is arranged statically within the small lens system 51 and the ocular optical system 5, the virtual image distance can be changed without using a movable element for moving the focus position. Therefore, even when the head-up display device is mounted on an automobile, there is no such concern that vibration of the automobile affects movement of the movable element and a problem occurs in forming plural virtual image planes having different virtual image distance (in other words, respective divided virtual image planes obtained by dividing one virtual image plane by the field of view).

Also, the separated light of the light emitted from the image forming unit passes through the first small lens system and the second small lens system simultaneously, and forms the virtual images simultaneously at different virtual image distances and in the different viewing directions. Thus, a head-up display device capable of simultaneously displaying virtual images with different virtual image distance can be provided.

As described above, according to the present embodiment, such display is possible as display of the attention arousing information on the preceding vehicle in the virtual image range corresponding to the position of the preceding vehicle, display of existence of a fallen object in the virtual image range corresponding to the position of the road surface of the road before the preceding vehicle, and so on. Also, according to the present embodiment, it is possible to display pictures simultaneously on plural virtual image planes positioned at different virtual image distances and in different viewing directions.

Further, it is preferable that information of "speed of own vehicle" and so on that are not related with an attention arousing object within the foreground are displayed in a virtual image range corresponding to the position of the preceding vehicle which falls in the viewing direction in a normal driving state.

Second Embodiment

Hereinafter, the second embodiment will be explained referring to the drawings. The point the second embodiment differs from the first embodiment is a point that the distance difference of 3 virtual image planes (3 divided virtual image planes obtained by dividing one virtual image plane into three by the field of view) of the second embodiment is larger than the distance difference of 3 virtual image planes of the first embodiment.

Figure 10:
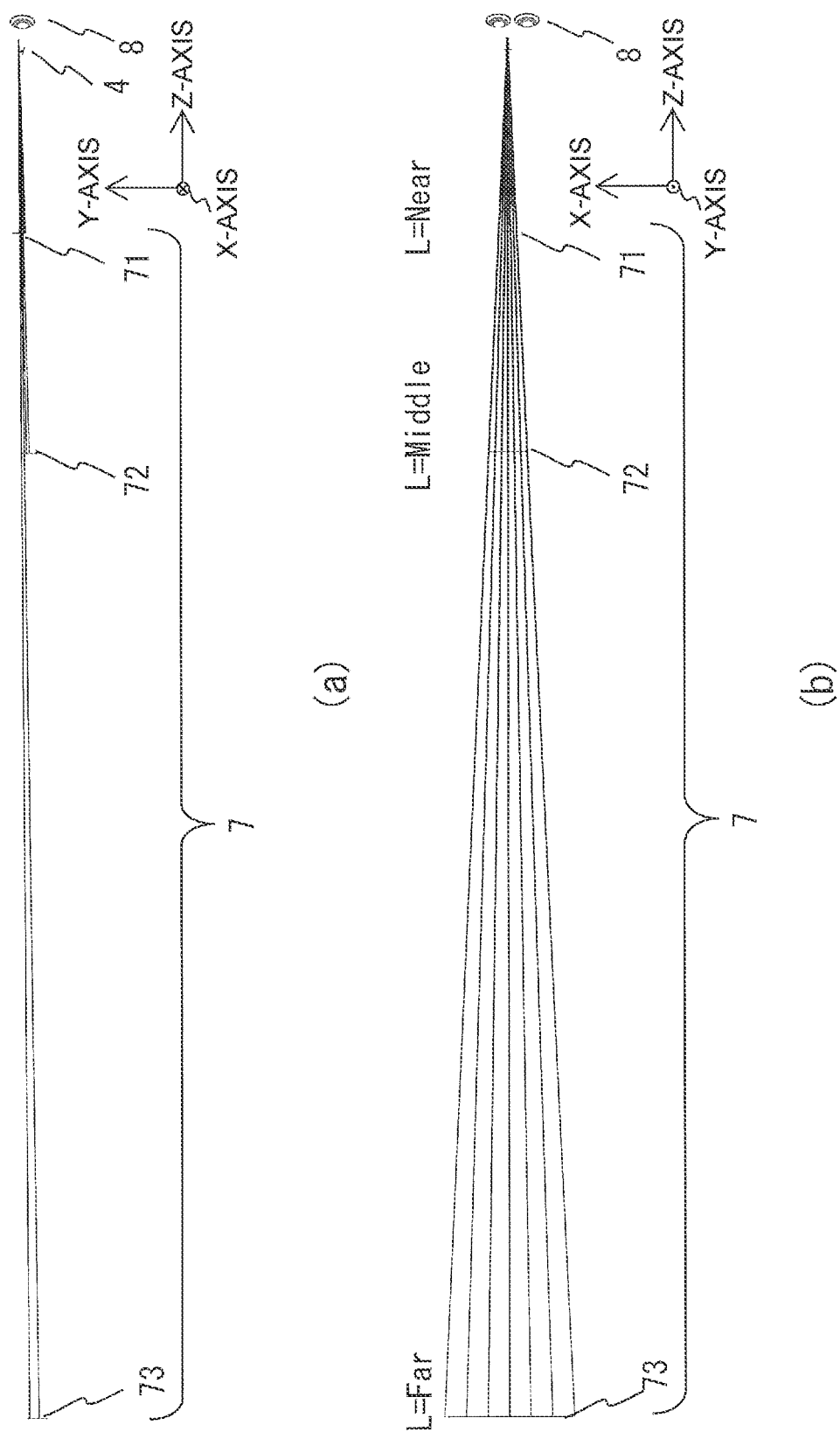
FIG. 10 is a total ray diagram of an ocular optical system of the second embodiment, (a) expresses a state where the picture information of the virtual image plane is viewed by the eyes of the driver in YZ plane, and (b) expresses a state where the picture information of the virtual image plane is viewed by the eyes of the driver in XZ plane.

The shape of the virtual image plane 7 will be explained referring to FIG. 10. FIG. 10 is a total ray diagram of the ocular optical system 5 of the second embodiment, (a) expresses a state where the visual information of the virtual image plane 7 is viewed by the eyes of the driver in YZ plane, and (b) expresses a state where the visual information of the virtual image plane 7 is viewed by the eyes of the driver in XZ plane. The right eye and the left eye overlap each other in YZ plane (refer to the reference sign 8), and the right eye and the left eye are seen separately in XZ plane.

The virtual image plane 7 is configured of 3 virtual image planes 71, 72, 73 whose virtual image distance changes in a line of sight direction relative to the line of sight direction of the front of the driver. The function is achieved by viewing the picture light on the screen plate (diffusion plate 4) arranged on the same plane surface by the ocular optical system 5 with respect to the virtual image plane 71 with the virtual image distance 14 m in the line of sight of 1.8 to 2.2 degrees relative to the line of sight of the front, the virtual image plane 72 with the virtual image distance 30 m in the line of sight of 1.1 to 1.5 degrees, and the virtual image plane 73 with the virtual image distance 100 m in the line of sight of 0.4 to 0.8 degrees. Also, the detail of the field of view will be supplemented in explanation of the distortion property of FIG. 16 and FIG. 17.

Figure 11:
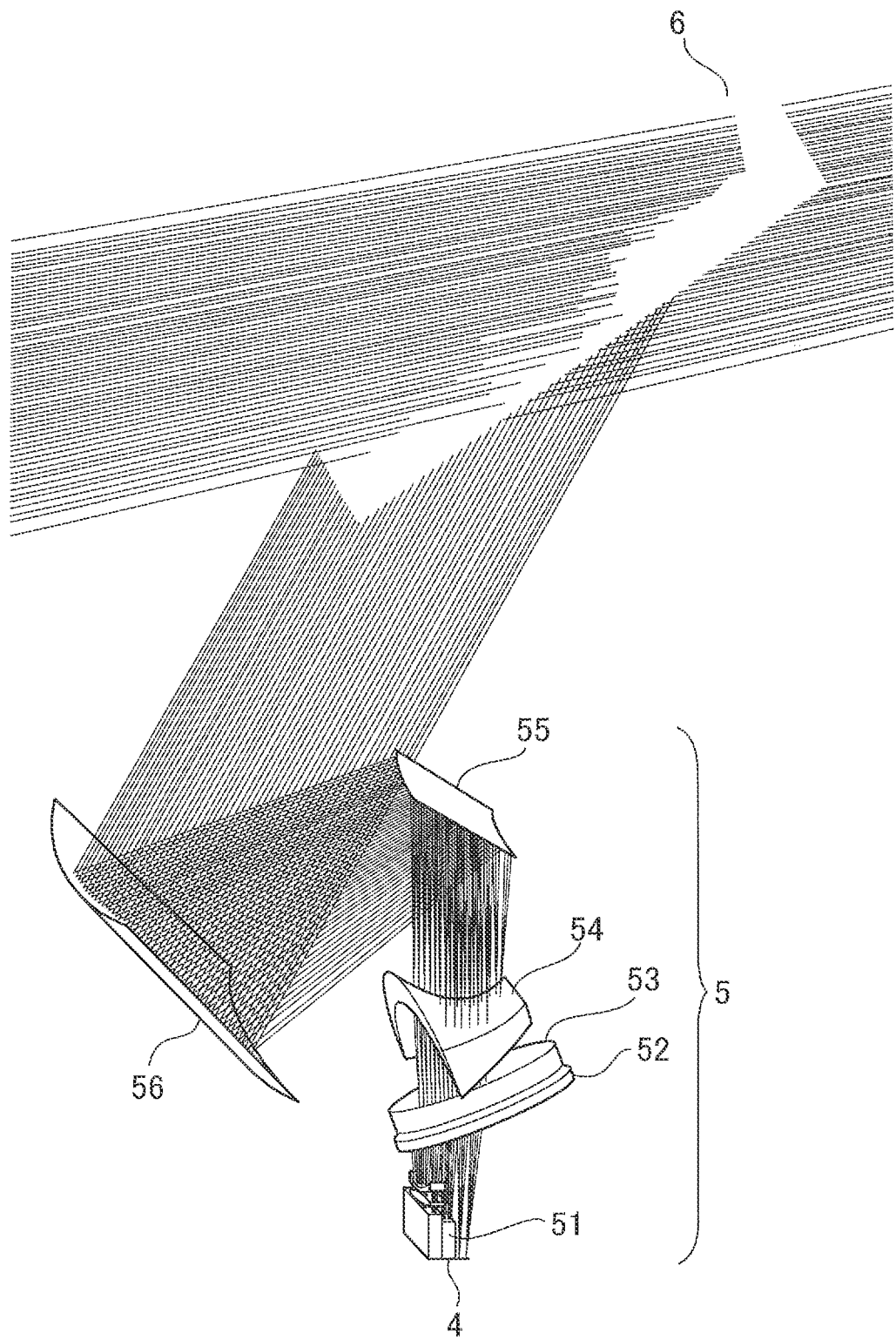
FIG. 11 is an enlarged view of an essential part of the ocular optical system of the second embodiment.
Figure 12:
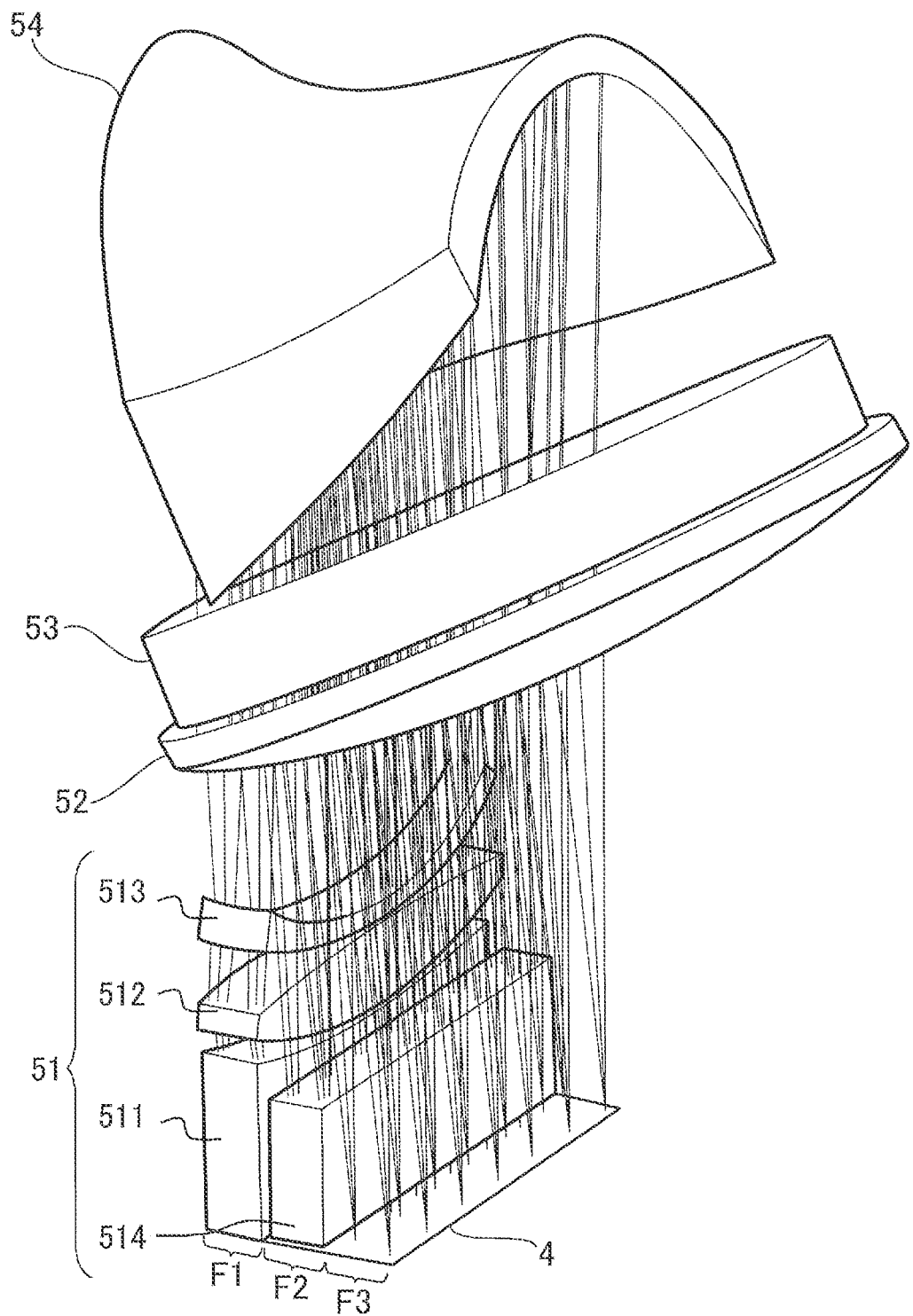
FIG. 12 is a perspective enlarged view of a lens unit of the ocular optical system according to the second embodiment.

FIG. 11 is an enlarged view of an essential part of the ocular optical system of the second embodiment. FIG. 12 is a perspective enlarged view of a lens unit of the head-up display device according to the second embodiment. As shown in FIG. 11 and FIG. 12, the ocular optical system 5 is configured so as to arrange, side by side, a small lens system 51, a convex lens 52 with positive refractive power, a concave lens 53 with negative refractive power, a rotationally asymmetric free-form curved surface lens 54, a reflecting mirror 55, and a rotationally asymmetric free-form curved surface mirror 56 in front of the windshield 6 in this order from the screen plate (diffusion plate) 4 side. By arranging the free-form curved surface mirror 56 and the reflecting mirror 55 so as to face each other, the optical path is bent into a Z-shape, and compactization of the head-up display device is achieved. The reflecting mirror 55 is a spherical mirror. The free-form curved surface lens 54 has a rotationally asymmetric shape, and has an action of correcting trapezoidal distortion. The convex lens 52 and the concave lens 53 have large eccentricity (no eccentricity in the front-rear direction). The thickness of the glass material of the small lens system 51 was reduced in the order of an optical path F1 whose virtual image distance was short, an optical path F2 whose virtual image distance was middle, and an optical path F3 whose virtual image distance was long. Further, although there exists the common screen plate (diffusion plate) 4 in FIG. 12, the thickness of the glass material of the small lens system 51 in the optical path F3 is 0 mm. Furthermore, the small lens system 51 also includes a filter 514 that is arranged in the optical path F2.

FIG. 13 is an enlarged view of a separated optical path according to the second embodiment. Since the lens data are arranged so as to attain a reduction optical system, the small lens system 51 is arranged at the position where the optical flux is divided before the screen plate (diffusion plate) 4 after the light flux emitted from the virtual image planes 71, 72, 73 whose viewing direction and virtual image distance are different from each other passes through an optical path that is common from the eye box to the convex lens 52. It is known that the light fluxes of respective optical paths F1, F2, F3 could be divided in this small lens system 51.

FIG. 14 is a drawing that shows lens data of the head-up display device according to the second embodiment. In the lens data shown in FIG. 14, the radius of curvature is expressed with a positive mark when the center position of the radius of curvature exists in the traveling direction, and the face-to-face distance expresses the distance on an optical axis from the apex position of each surface to the apex position of the next surface. The total thickness of the glass material of the small lens system is 22.3 mm (=2+7.5+12.8) for the virtual image distance 14 m, the total thickness of the glass material of the small lens system is 12.108 mm for the virtual image distance 30 m, and the total thickness of the glass material of the small lens system is 0 mm for the virtual image distance 100 m.

"Eccentricity" represents a value in Y-axis direction, and "tilting" represents rotation around X-axis within YZ plane. "Eccentricity/tilting" is applied in the order of eccentricity and tilting at a surface in question. "Ordinary eccentricity" represents that a next surface is arranged at a position of the face-to-face distance on the new coordinate system where eccentricity/tilting have been applied. Eccentricity and tilting of "decenter & return" are applied only at the surface in question, and do not affect the next surface.

"PMMA" of the glass material name represents polymethyl methacrylate of a plastic, and "58.3" of the glass material name represents material having the refractive index of 1.58 and Abbe's number of 30.

FIG. 15 is a drawing of free-form curved surface factors of the head-up display device according to the second embodiment. The free-form curved surface factor of FIG. 15 is obtained by the formula (1) described above.

The free-form curved surface factor $C_j$ is a shape rotational asymmetric with respect to the optical axis (Z-axis) of each, and is a shape defined by a component of the circular cone member and a component of the member of the XY polynomial. For example, when X is of the second order (m=2) and Y is of the third order (n=3), a factor of $C_{19}$ where $j=\{(2+3)^2+2+3\times3\}/2+1=19$ corresponds. Also, the position of the optical axis of each of the free-form curved surface is determined by the amount of eccentricity/tilting in the lens data of FIG. 14.

Further, the anamorphic non-spherical surface factor of the head-up display device according to the second embodiment is obtained by the formula (2) described above. However, the anamorphic non-spherical surface shape is a rotationally asymmetric shape, and is defined by the circular cone constant Kx and the curvature cux (=inverse number of radius of curvature) in XZ cross section and the circular cone constant Ky and the curvature cuy (=inverse number of radius of curvature) in YZ cross section in the coordinate space of XYZ axes (Z-axis=optical axis). With respect to cuy (=1/rdy) and cux (=1/rdx) in the formula (2), rdy=9,686 mm and rdx=5,531 mm in FIG. 5, and all of the other factors were made 0 (description was omitted).

Also, the values of the eye box size, field of view angle, and so on of the ocular optical system of the second embodiment are shown below in the order of the horizontal direction and the vertical direction.

Eye box size 100×50 mm

Effective size of picture light at screen plate 41.7× 15.4 mm

Field of view angle(full picture angle) 5.4×1.8 degrees

Separated optical path (vertical viewing direction, virtual image size, virtual image distance)

F1 1.8 to 2.2 degrees, 1,320×98 mm, 14 m

F2 1.1 to 1.5 degrees, 2,830×210 mm, 30 m

F3 0.4 to 0.8 degrees, 9,432×698 mm, 100 m

Figure 16:
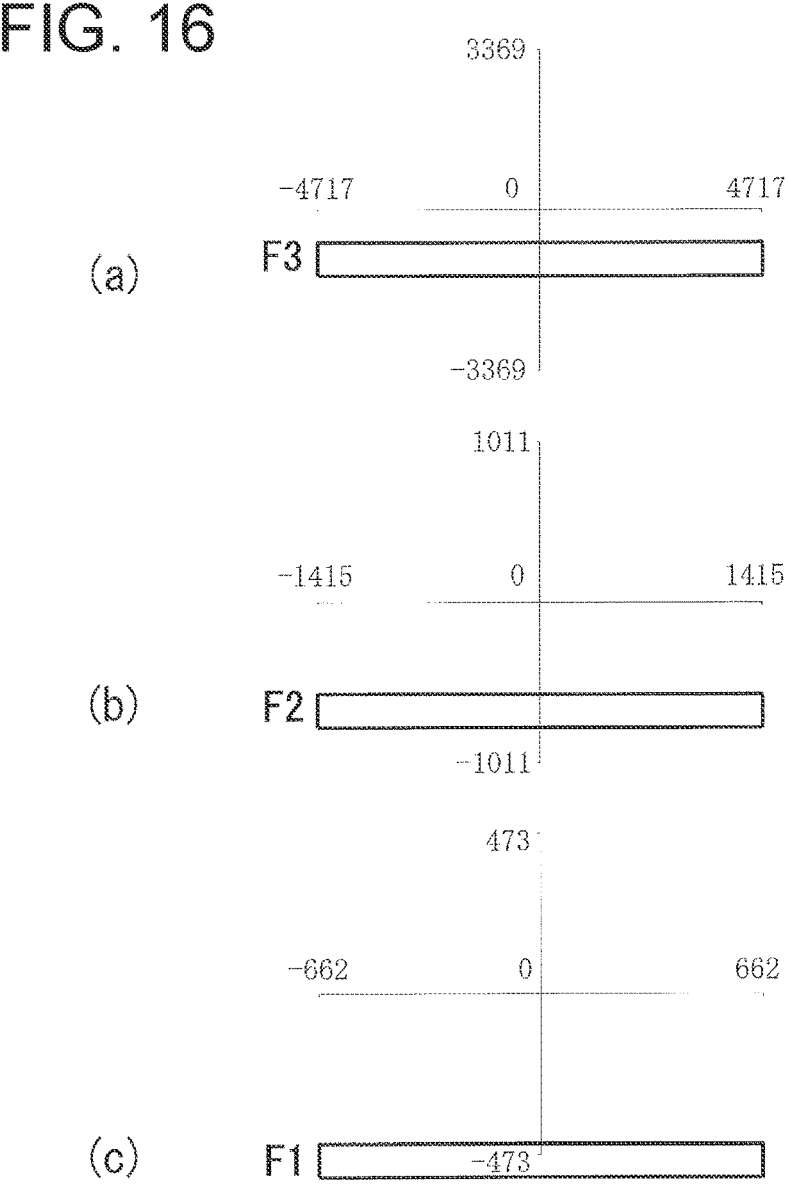
FIG. 16 is a drawing that expresses the distortion property of each separated optical path according to the second embodiment.
Figure 17:
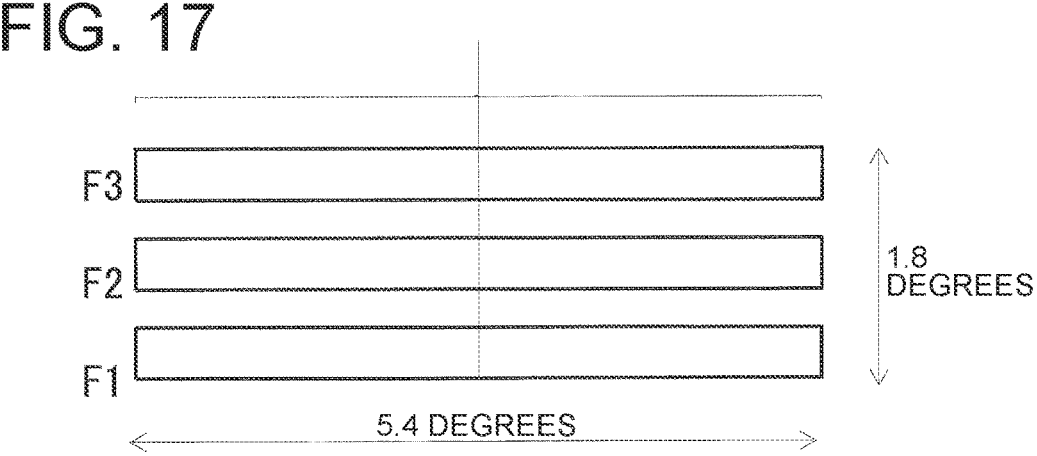
FIG. 17 is a drawing that expresses the total distortion property of the ocular optical system of the second embodiment.
Figure 18:
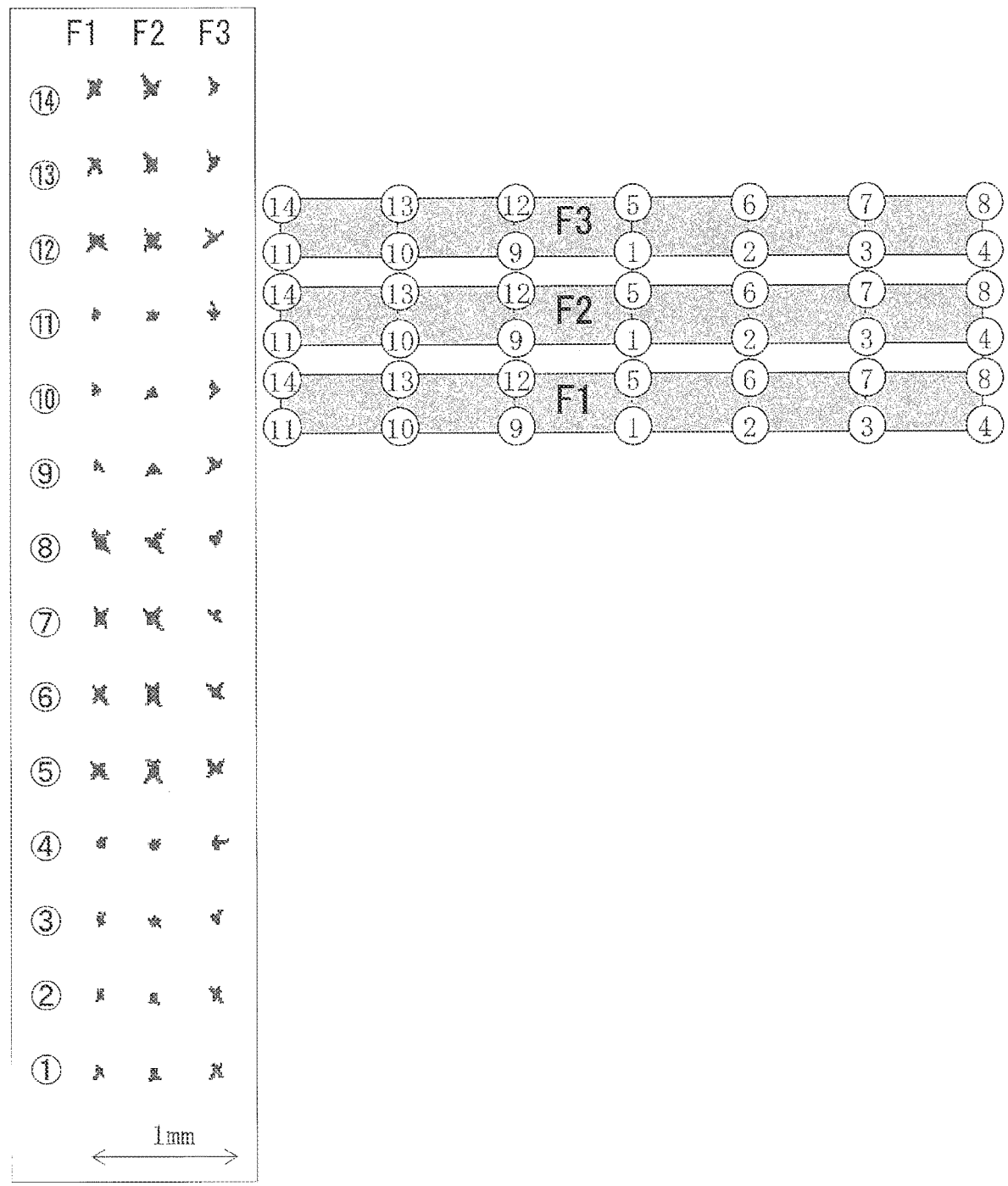
FIG. 18 is a spot diagram of the ocular optical system of the second embodiment.

Next, the optical performance of the second embodiment will be explained using FIG. 16 to FIG. 18. FIG. 16 and FIG. 17 are drawings that express the distortion property of the head-up display device of the second embodiment. FIG. 18 is a spot diagram of the head-up display device of the second embodiment.

FIG. 16 is a drawing that expresses the distortion property of each separated optical path according to the second embodiment in the virtual image planes 71, 72, 73, and it is known that a rectangular virtual image is achieved in each virtual image plane. When the field of view angle is calculated from the virtual image size in respective virtual image planes 71, 72, 73, the horizontal field of view angle (full picture angle) of the field of view F1 becomes 2×tan(1,698/2/14,000)=5.4 degrees, the horizontal field of view angle (full picture angle) of the field of view F2 becomes 2×tan(2,830/2/30,000)=5.4 degrees, and the horizontal field of view angle (full picture angle) of the field of view F3 becomes 2×tan(9,432/2/100,000)=5.4 degrees. Although the field of views at respective virtual image planes 71, 72, 73 are collectively expressed in FIG. 17 because the field of view angle in the horizontal direction in each virtual image plane 71, 72, 73 has the same value, it is known that respective field of views F1, F2, F3 are displayed at positions shifted in the vertical direction.

FIG. 18 shows a spot diagram in which object points are arranged in the virtual image planes 71, 72, 73 respectively and the spot diagram at the screen plate 4 is calculated, and excellent optical performance has been achieved. Also, this spot diagram is for the total light flux of a case where the size of the eye box 9 is 100 mm horizontal×50 mm vertical. In the case of a virtual image viewed by an actual driver, the spot diagram in the size of the pupil of the eye of a human being (said to be 7 mm in diameter at maximum) is substantially improved compared to FIG. 18.

Therefore, according to the present embodiment, a head-up display device can be provided which can display pictures as virtual images at different virtual image distances and in different viewing directions simultaneously by a projection optical system using a free-form curved surface lens and a free-form curved surface mirror.

Thus, such display is possible as display of the attention arousing information on the preceding vehicle in the virtual image range corresponding to the position of the preceding vehicle, display of existence of a fallen object in the virtual image range corresponding to the position of the road surface of the road before the preceding vehicle, and so on. Also, according to the present embodiment, it is possible to display pictures simultaneously on plural virtual image planes positioned at different virtual image distances and in different viewing directions.

Further, it is preferable that information of "speed of own vehicle" and so on that are not related with an attention arousing object within the foreground are displayed in a virtual image range corresponding to the position of the preceding vehicle which falls in the viewing direction in a normal driving state.

Third Embodiment

Figure 25:
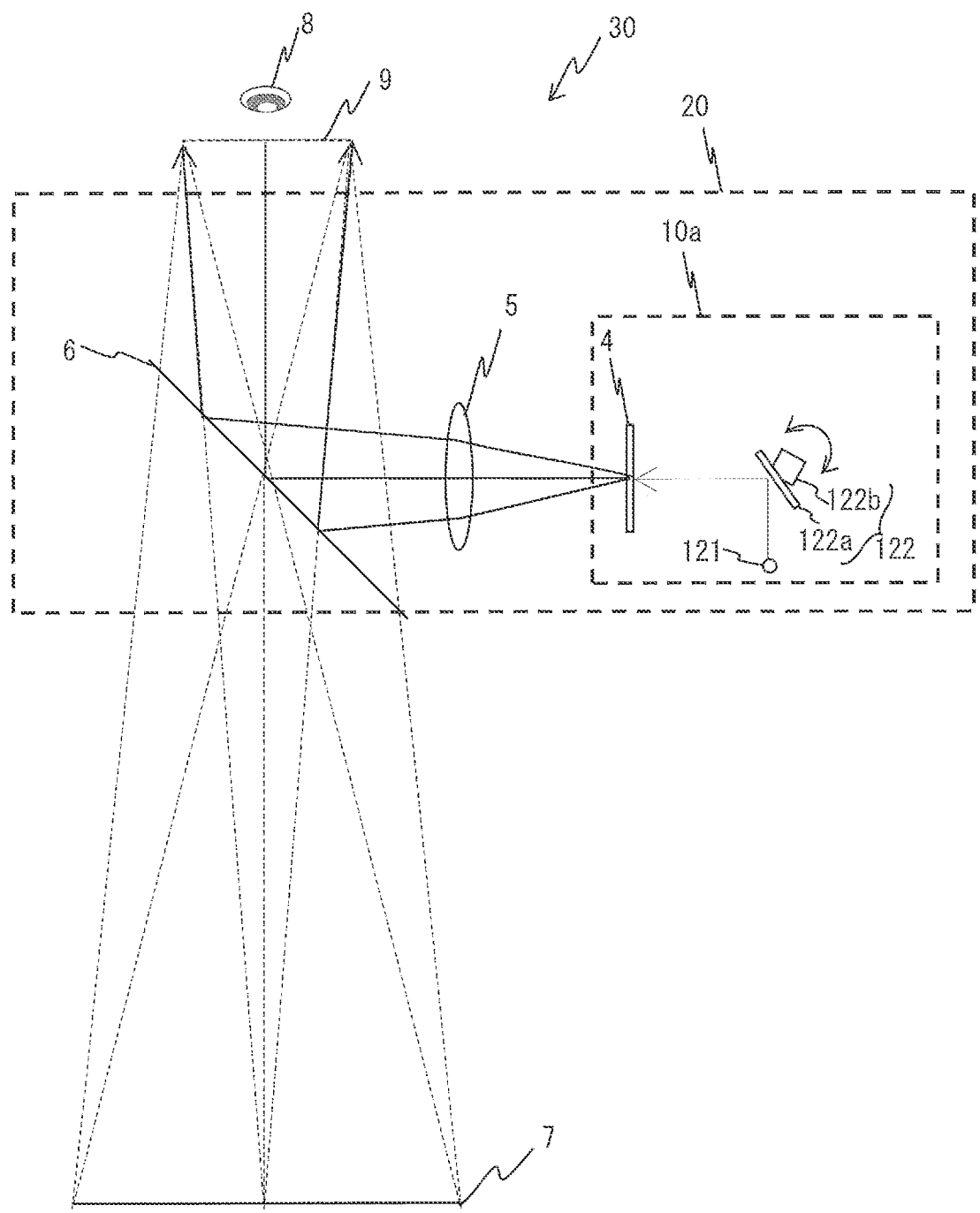
FIG. 25 is a schematic configuration drawing of a head-up display device using micro-electromechanical systems.

The third embodiment is characterized in a point that the configuration of the image forming unit 10 is different from that of the first embodiment and the second embodiment. FIG. 25 is a schematic configuration drawing of a head-up display device using micro-electromechanical systems.

That is to say, although the picture information of the liquid crystal display panel 2 is mapped on the screen plate 4 having a diffusion function in the first embodiment, instead of the configuration of this image forming unit 10, an image forming unit 10a according to the third embodiment may use the image forming unit 10a using micro-electromechanical systems that include a laser light source 121, a light scanning unit 122 that executes light scanning of the laser light source 121 and includes a mirror 122a and a mirror drive unit 122b that changes the angle of the mirror 122a with respect to the laser light source 121, and a screen plate 123 that has a diffusion function as shown in FIG. 25.

Fourth Embodiment

Figure 26:
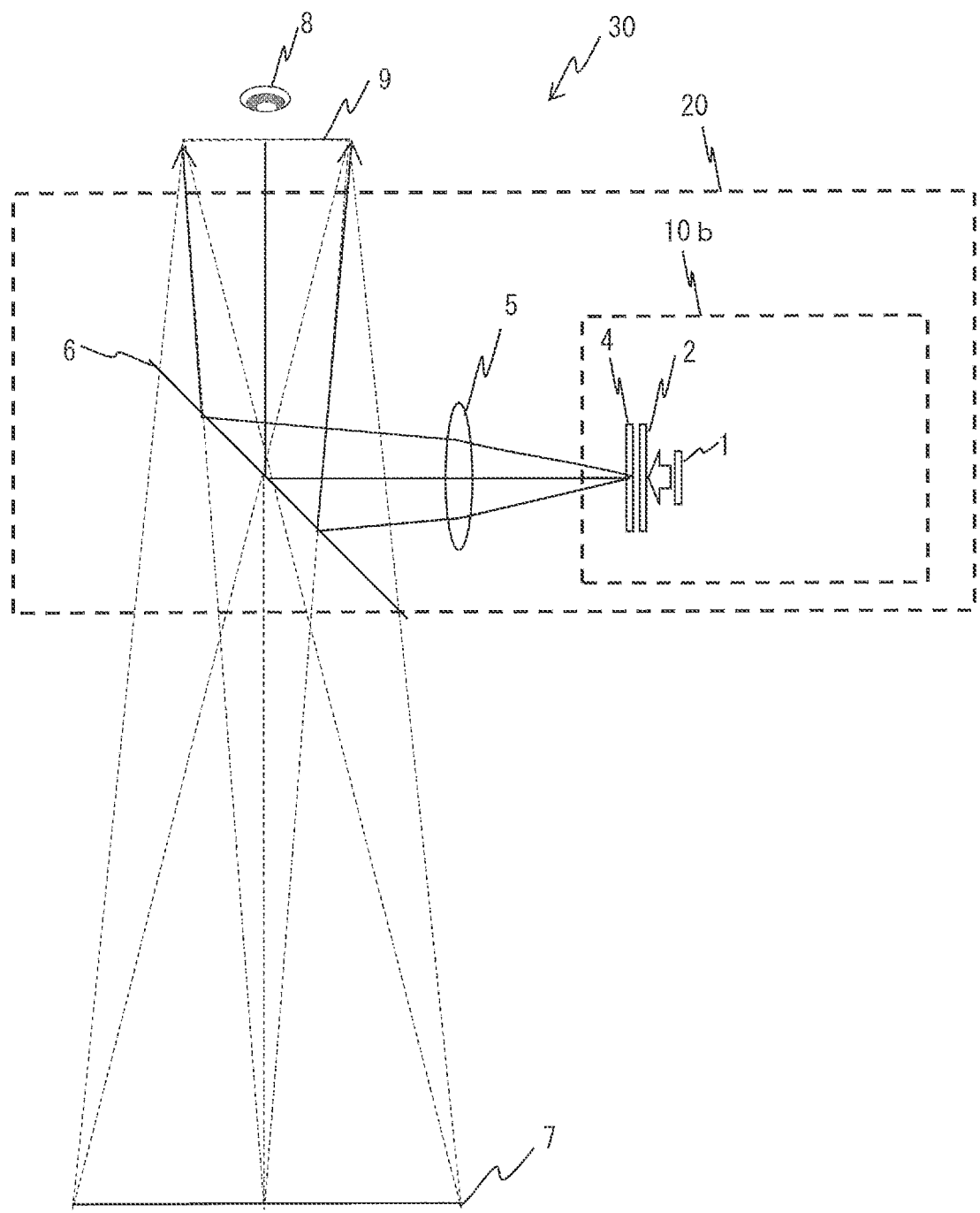
FIG. 26 is a schematic configuration drawing of a head-up display device of a liquid crystal display panel system not using a relay optical system.

The fourth embodiment is also characterized in a point that the configuration of the image forming unit 10 is different from that of the first embodiment and the second embodiment. FIG. 26 is a schematic configuration drawing of a head-up display device of a liquid crystal display panel system not using a relay optical system. Although the picture light of the liquid crystal display panel 2 is mapped by the relay optical system 3 in the first embodiment, as shown in FIG. 26, in an image forming unit 10b according to the fourth embodiment, it is configured to radiate the light of the backlight 1 directly onto the liquid crystal display panel 2 larger than that of the first embodiment, and to display the light as the virtual image 7 by the ocular optical system 5 as the picture light including the picture information displayed on the liquid crystal display panel 2.

Also, in this fourth embodiment, when the spread of the light flux of the backlight 1 is insufficient, a diffusion plate is arranged in the vicinity of the liquid crystal display panel 2.

Further, as an effect common to the first, second, third and fourth embodiments, compactization of the head-up display device is achieved by bending the optical path by a mirror arranged between the free-form curved surface lens and the free-form curved surface mirror and thereby bending the optical path into a Z-shape along with the free-form curved surface mirror. However, according to the configuration of arranging the head-up display device body excluding the free-form curved surface mirror in the vicinity of the back mirror without arranging the mirror between the free-form curved surface lens and the free-form curved surface mirror, this mirror can be made unnecessary.

REFERENCE SIGNS LIST

1 . . . Backlight
2 . . . Liquid crystal display panel
3 . . . Relay optical system
4 . . . Screen plate (diffusion plate)
5 . . . Ocular optical system
6 . . . Windshield
7 . . . Virtual image plane
8 . . . Eyes of driver
9 . . . Eye box
10 . . . Image forming unit
51 . . . Small lens system
52 . . . First lens
53 . . . Second lens
54 . . . Free-form curved surface lens
55 . . . Spherical mirror
56 . . . Free-form curved surface mirror
101 . . . Own vehicle
102 . . . Preceding vehicle
103 . . . Long distance line of sight
104 . . . Short distance line of sight
105 . . . Road surface
201 . . . Focus lens
202 . . . Object plane
203 . . . Real image plane
251 . . . Filter
301 . . . Ocular lens
302 . . . Object plane
303 . . . Virtual image plane 351 . . . Filter
511, 512, 513 . . . Small lens
514 . . . Filter

The invention claimed is:

1. A projection optical system comprising:
an ocular optical system that displays a virtual image by reflecting light emitted from an image forming unit that emits light including image information,
wherein the ocular optical system at least includes a spherical lens, a free-form curved surface lens, and a free-form curved surface mirror,
wherein the ocular optical system is configured to arrange a first small lens system and a second small lens system in a space on the ocular optical system side of a plane conjugate with a virtual image plane side by side along the conjugate plane,
wherein separated light of the light emitted from the image formation unit is incident upon the first small lens system and the first small lens system achieves a first focus position movement amount,
wherein separated light of the light emitted from the image formation unit is incident upon the second small lens system and the second small lens system achieves a second focus position movement amount that is shorter than the first focus position movement amount,
wherein the ocular optical system further includes a first optical path formed by the first small lens system, a second optical path formed by the second small lens system, and a third optical path formed without including the first small lens system and the second small lens systems, which are arranged side by side along the conjugate plane, and
wherein the second focus position movement amount in the second optical path is shorter than the first focus position movement amount in the first optical path, and a thickness of a medium in the third optical path is 0 mm.

2. The projection optical system according to claim 1, wherein a total thickness of a medium of the first small lens system is thicker than a total thickness of a medium of the second small lens system.

3. The projection optical system according to claim 1,
wherein a virtual image distance from a first virtual image plane where a virtual image formed by the light having passed through the first small lens system is displayed to an observer of the virtual image is shorter than a virtual image distance from a second virtual image plane where a virtual image formed by the light having passed through the second small lens system is displayed to the observer of the virtual image, and
the first virtual image plane is positioned closer to an end section of a field of view of the observer compared to the second virtual image plane.

4. The projection optical system according to claim 1, wherein a non-display region where a virtual image is not displayed is arranged between a first virtual image plane on which a virtual image formed by light having passed through the first small lens system is mapped and a second virtual image plane on which a virtual image formed by light having passed through the second small lens system is mapped.

5. The projection optical system according to claim 1, wherein a reflecting mirror is arranged between the free-form curved surface lens and the free-form curved surface mirror.

6. A head-up display device comprising:
an image forming unit that emits light including image information; and
an ocular optical system that displays a virtual image by reflecting light emitted from the image forming unit,
wherein the ocular optical system at least includes a spherical lens, a free-form curved surface lens, and a free-form curved surface mirror,
wherein the ocular optical system is configured to arrange a first small lens system and a second small lens system in a space on the ocular optical system side of a plane conjugate with a virtual image plane side by side along the conjugate plane,
wherein separated light of the light emitted from the image formation unit is incident upon the first small lens system and the first small lens system achieves a first focus position movement amount,
wherein separated light of the light emitted from the image formation unit being incident upon the second small lens system and the second small lens system achieves a second focus position movement amount that is shorter than the first focus position movement amount,
wherein the ocular optical system further includes a first optical path formed by the first small lens system, a second optical path formed by the second small lens system, and a third optical path formed without including the first small lens system and the second small lens systems, which are arranged side by side along the conjugate plane, and
wherein the second focus position movement amount in the second optical path is shorter than the first focus position movement amount in the first optical path, and a thickness of a medium in the third optical path is 0 mm.

7. The head-up display device according to claim 6, wherein a total thickness of a medium of the first small lens system is thicker than a total thickness of a medium of the second small lens system.

8. The head-up display device according to claim 6,
wherein a virtual image distance from a first virtual image plane where a virtual image formed by the light having passed through the first small lens system is displayed to an observer of the virtual image is shorter than a virtual image distance from a second virtual image plane where a virtual image formed by the light having passed through the second small lens system is displayed to the observer of the virtual image, and
the first virtual image plane is positioned closer to an end section of a field of view of the observer compared to the second virtual image plane.

9. The head-up display device according to claim 6, wherein a non-display region where a virtual image is not displayed is arranged between a first virtual image plane on which a virtual image formed by light having passed through the first small lens system is mapped and a second virtual image plane on which a virtual image formed by light having passed through the second small lens system is mapped.

10. The head-up display device according to claim 6, wherein a reflecting mirror is arranged between the free-form curved surface lens and the free-form curved surface mirror.

11. The head-up display device according to claim 6, wherein the image forming unit is configured to include a liquid crystal display panel that displays image information becoming a mapping object and has transmittivity, a relay optical system on which a light flux having passed through the liquid crystal display panel and including the image information is made to be incident, and a screen plate that has a diffusion function.

12. The head-up display device according to claim 6, wherein the image forming unit is configured to include a laser light source, a light scanning unit that executes light scanning of the laser light source, and a screen plate that has a diffusion function.

\* \* \* \* \*